(12) United States Patent
Tang et al.

(10) Patent No.: US 9,892,364 B2
(45) Date of Patent: Feb. 13, 2018

(54) METHOD FOR VIRTUALIZATION OF A BRAIN-LIKE COMPUTING SYSTEM

(71) Applicant: Transoft (Shanghai), Inc., Shanghai (CN)

(72) Inventors: Changbin Tang, Shanghai (CN); Li Xiong, Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 942 days.

(21) Appl. No.: 14/097,377

(22) Filed: Dec. 5, 2013

(65) Prior Publication Data

US 2015/0052092 A1    Feb. 19, 2015

(30) Foreign Application Priority Data

Aug. 16, 2013  (CN) .......................... 2013 1 0360143

(51) Int. Cl.
*G06N 99/00*    (2010.01)
*G06N 3/02*    (2006.01)

(52) U.S. Cl.
CPC ............. *G06N 99/002* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 7,400,282 B2* | 7/2008 | Tanaka | B82Y 10/00 327/31 |
| 2011/0140736 A1* | 6/2011 | Yoder | G06N 3/0436 326/106 |

* cited by examiner

*Primary Examiner* — Christyann Pulliam
*Assistant Examiner* — Robert Bejcek, II
(74) *Attorney, Agent, or Firm* — Occhiuti & Rohlicek LLP

(57) ABSTRACT

The invention discloses the technology of brain-like computing virtualization. Brain-like computing means the computing technology to mimic human brain and generate human intelligence automatically with computer software. Here the unconscious engine and conscious engine are used to define human left and right brain, while the virtualization technology is used for software to run on future hardware, such as quantum computer and molecular computer. The applied domain areas include quantum gate and adiabatic quantum simulation, brain-like autonomic computing, traditional multi-core-cluster performance service, software development/service delivery systems, and mission-critical business continuity/disaster recovery.

16 Claims, 26 Drawing Sheets

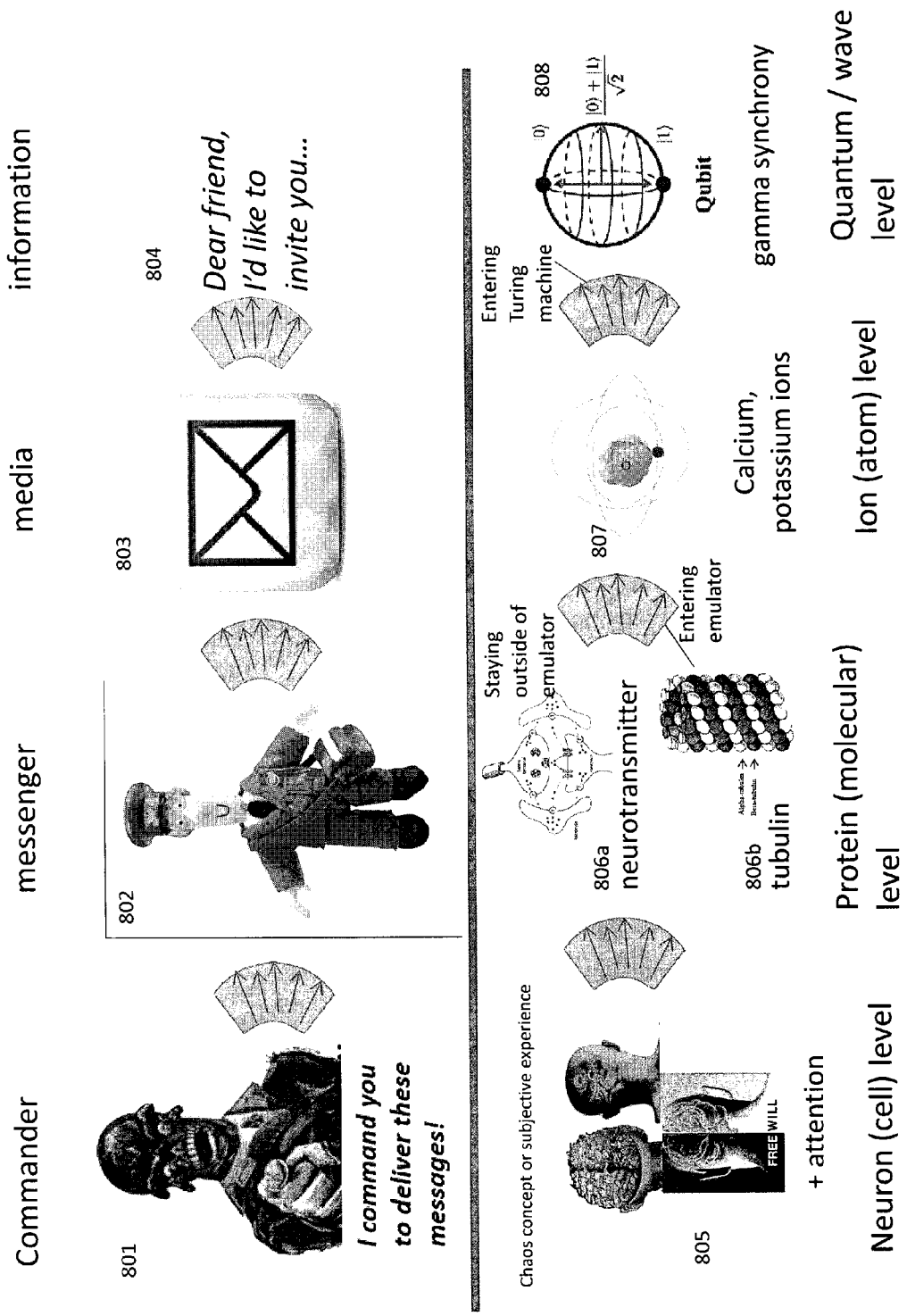

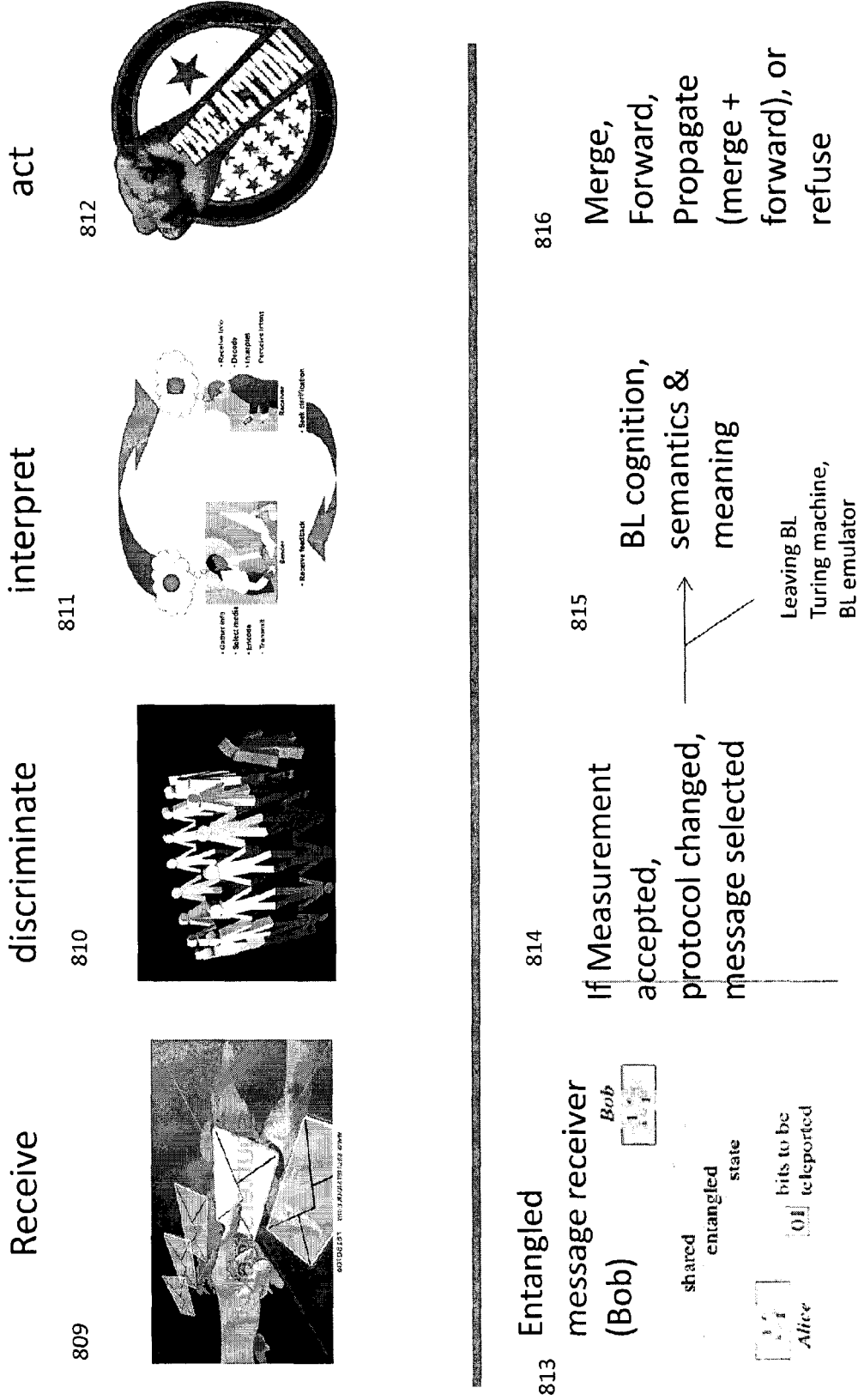

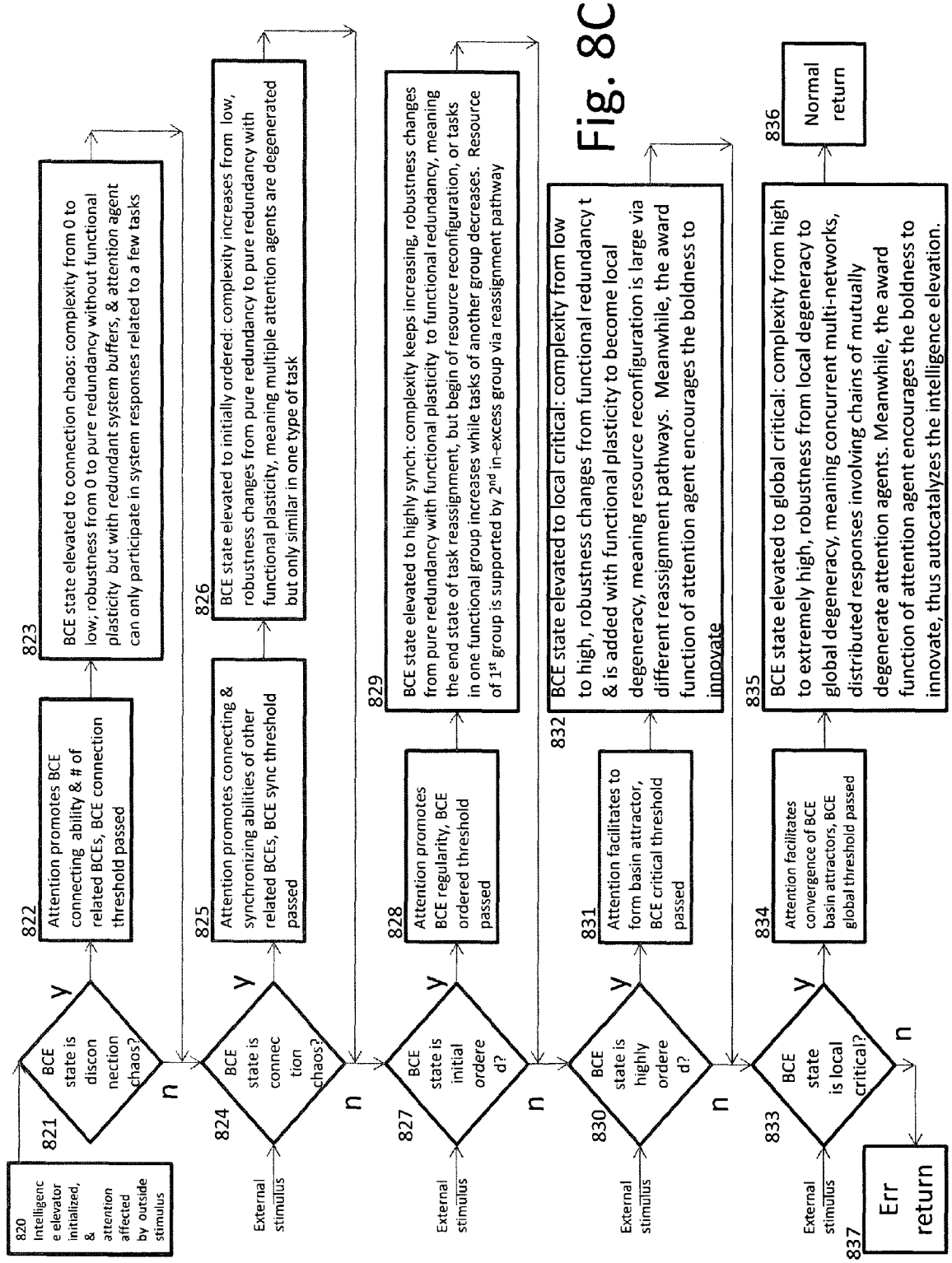

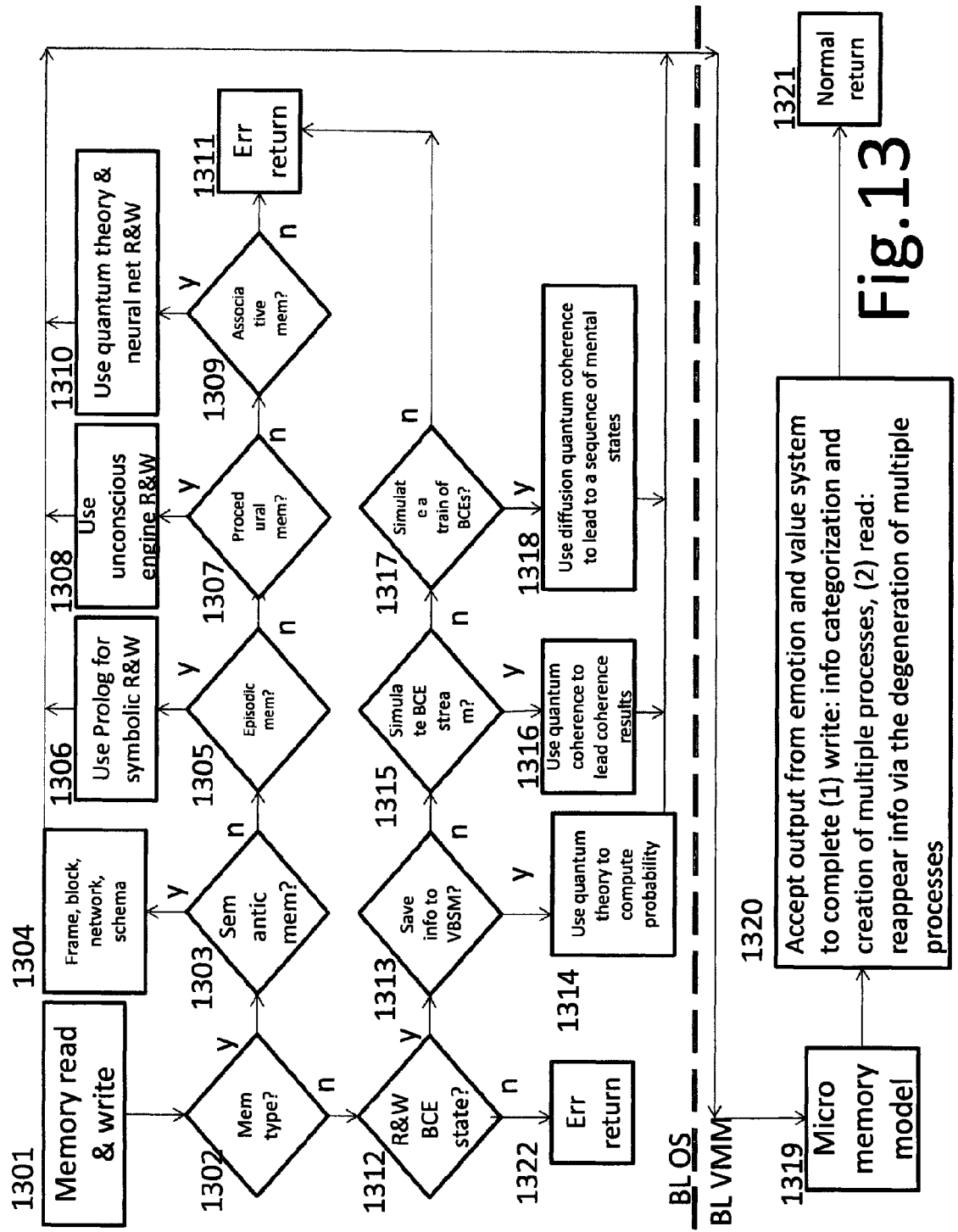

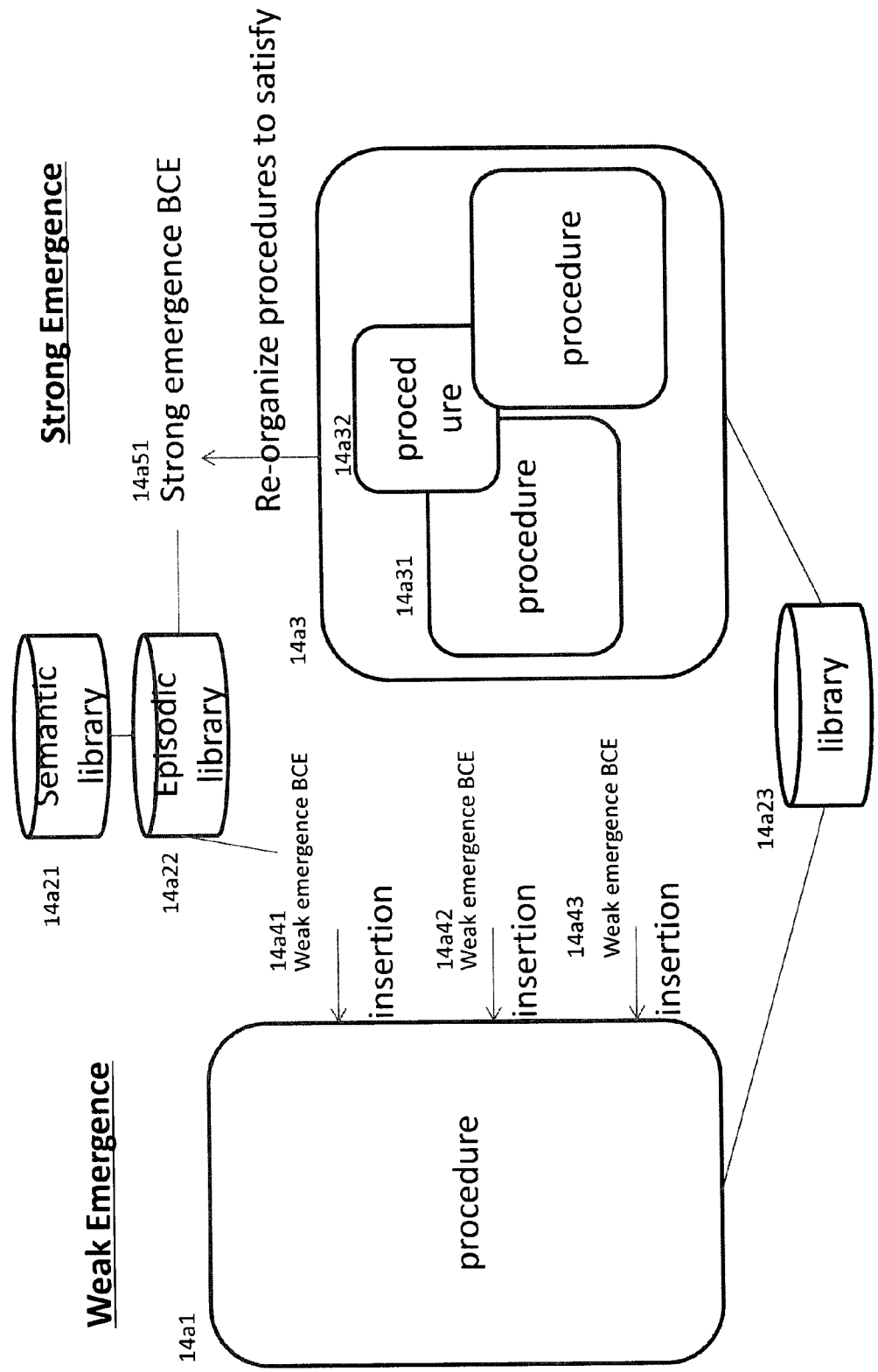

METHOD FOR VIRTUALIZATION OF A BRAIN-LIKE COMPUTING SYSTEM

RELATED APPLICATIONS

Under 35 USC 119, this application claims the benefit of the priority date of Chinese Application No. 201310360143.9, filed on Aug. 16, 2013, the contents of which are herein incorporated by reference.

FIELD OF INVENTION

The invention discloses the technology of brain-like computing virtualization.

PRIOR ART

The expert system and industrial problem

The blossom of Artificial Intelligence (AI) techniques in the 80's starts the use of expert systems. These systems rely on knowledge engineers to input rules, formulate them, and use them to answer various questions that require expertises. For example, a business continuity/disaster recovery (BC/DR) system may use a rule like "if CPU utility is in a 95% busy state for a long time, start mediating the computing resources." However, this rule must rely on a knowledge engineer to input instead of auto-generate. In addition, to a question like "how to react to a system crash of a banking computer system?", an expert system can prepare diagnostic rules for answering, but it can never auto-generate the following creative answer: "yesterday is the start of long holidays, is it possible someone modifies the system configuration in a hurry, which leads to system crash?". In another case, to questions like "how to design a BC/DR system to prevent crash disaster?", the traditional expert system is unable to self-organize and output an engineering design of an enterprise BC/DR system. Hence the long-felt but never-answered industrial question is:

"How does a computer system automatically generate creative intelligence?"

Examples are: obtaining root cause, turning out a design, or generating a self-improved system.

The autonomic computing promoted by IBM since 2000 mimicks the executive functions of a human brain: monitoring, analyzing, planning and executing, but it is unable to generate intelligence. Around the same time, machine learning AI techniques such as artificial neural net and symbolic computing perhaps have limited progress but no breakthrough to generate intelligence. It is an exceptional event that the 2006 IBM Watson expert system won over the human expert in a broadcasted Jeopardy TV game. To focus on Jeopardy questions, Watson inputs contents of 0.2 billion webpages, including the entire Wikipedia. It is true that Watson made a great stride in building a semantic network to hold the knowledge, but still Watson is unable to generate truly creative intelligence. Nevertheless, in 2012 IBM merges Watson expert system into its Smart Cloud products, co-named PureSystems and Expert Integrated Systems. This modern expert system is able to assist cloud computing to deploy complex resources and optimize workload. It is however unable to generate intelligence for self-improvement. Likewise, MIT Bliss and Hoffman USA patent U.S. Pat. No. 7,983,890 takes advantage of intelligent method to observe, decide, and act (ODA) for the performance of multi-core computer systems. It utilizes a pre-set method to optimize performance, which is not a creative self-improvement.

Quantum Consciousness

Stuart Kauffman, in his 2011 patent US 2012/0071333 A1 mentions the human thinking may be generated by self-organizing and emergent method. Further, he thinks that it is necessary to use molecular computer or quantum computer since the speed of traditional computing cannot meet the speed of a human brain. Therefore, it is a breakthrough to say "quantum consciousness" may generate brain-like thinking. Kauffman resolves the following two difficult problems that bother AI scientist for years:

Binding Problem 1 (BP1): all expert knowledge or expert intelligence confronts with questions like how to predict knowledge, categorize knowledge, or generate new knowledge from "similar" knowledge. In general, people regard these as impossibilities. Kauffman solution is this: since we cannot predict all possible knowledge/intelligence and categorize them, and obtain new intelligence from similarity, we might as well to mimick the nature law of self-organizing, like the snow flakes in winter forming a beautiful hexagon, a result of self-organizing. From this he assumes intelligence may be generated from self-organizing. IBM patent U.S. Pat. No. 7,484,121 is one example of such a mathematical model. However, like Kauffman, these patents propose no technical means to realize the theory using computer software/hardware.

Binding Problem 2 (BP2): a more fundamental question is: how the physical brain generates abstract intelligence? How computer can mimic human brain to generate intelligence? Quantum consciousness answers these questions: traditional computer with bit=0 or 1 generates intelligence ineffectively. Quantum computer with qubit=vector and tensor or molecular computer may generate better intelligence. It is a great stride that Kauffman in his patent embeds emergence theory into a quantum Trans-Turing System (TTS). However, there is no realization from computer engineering method. In addition, the recent braiding method of topological quantum computing for error correction nullifies TTS re-coherence.

Kauffman's other problems:

(1) How to be sure the matching of "red", "blue", "triangle", and "square" is correct? For instance, why is it "red triangle and blue square" rather than "blue triangle and red square"? Kauffman provides no clear solution on this. However, new field "quantum cognition" resolves the problem: the important elements of a concept may be evaluated by quantum cognition to obtain elemental reasonableness, the composed reasonableness from individual elements, and the intelligence grade. Please refer to Aerts 2012 paper "Concepts and Their Dynamics: A Quantum-Theoretic Model of emergence".

(2) The other two masters of quantum consciousness, Henry Stapp and Jeffrey Schwartz, when extending Von Numan processes 1 & 2 to processes 0, 1, 2, & 3 (called vNs process), notice how free will influences quantum measurement. Please refer to Schwartz 2004 paper "Quantum physics in neuroscience and psychology: model of mind-brain interaction". Kauffman has no clear solution to introduce free will.

(3) Is it true that the release of brain neurotransmitters relates to intelligence? According to the laboratory results by Stuart Hameroff from the Consciousness Research Center of the University of Arizona, the real intelligence and its delivery and entanglement, come from synchrony of vibrated gamma ray transmission. Please refer to Hameroff 2010 paper "The conscious pilot: dentritic synchrony moves through the brain to mediate consciousness". The neurotransmitter released by synapse in Kauffman and Schwartz finding, conducts just chemical transmission, not real intelligence.

Other Solutions

Currently, most of the so-called biologically inspired cognitive architectures (BICA) run on traditional computer, and do not consider any need of molecular or quantum hardware or any support of BL consciousness in the domain of quantum/molecular consciousness. Some organic computing architecture may use emergence model, but does not consider quantum consciousness or quantum cognition. We believe they cannot generate brain-like, intelligent concept if the root of the problem is not touched.

Although there have been arguments within the academic community to the 3 theories (emergence theory, quantum consciousness, and quantum cognition), the direction provide by them toward correctness is not shaking. It is just lack of technical means by computer engineering, not to mention the application systems after engineering realization. One of the difficulties to realize quantum consciousness is that so far the hardware of quantum computing is still in the laboratory except the commercialized 512-qubit D-Wave2 quantum machine from the Canadian company D-Wave, Inc. For pure quantum Turing machine, Tanaka patent, U.S. Pat. No. 7,400,282 B2, touches engineering method but cannot resolve the problem faced by quantum consciousness. As for Yoder's published patent application US2011/0140736A1, "Systems and Methods of Brain-like Information Processing", that is entirely a brain-like design from logic circuit and hardware viewpoints. The invention disclosed here starts with virtualization and software angle and does not emphasize hardware design.

The Jagon "Brain-like"

The said quantum consciousness or quantum cognition is just one embodiment of the disclosed invention. In reality there may be other methods such as those in molecular computing. Since the methods are general in nature we shall use the wording of BL emergence, BL consciousness and BL cognition for the 3 theories hereafter. The wording of "brain-like (BL)" also has wider meaning in this disclosed invention: BL engine is used to mean affective engine, unconscious engine, or conscious engine; BL computing means a mixed solution of conventional computing, molecular computing and quantum computing.

SUMMARY OF INVENTION

The purpose of the invention is to disclose a method of brain-like computing virtualization. Brain-like computing involves technology mimicking human brain to automatically generate intelligence. The disclosed invention concerns computer engineering method and virtualization technology to realize the said purpose. The method employs unconscious engine and conscious engine to define human left brain and right brain and software virtualization method to run on top of quantum computer or molecular computer. The application systems include gate-model and adiabatic-model quantum simulation, BL autonomic computing, and other applications of emergence communication.

In traditional computing, virtualization normally means the insertion layer between computer's operating system (OS) and traditional hardware, often referred to as virtual machine monitor (VMM). In brain-like computing, BL VMM is the layer inserted between BL OS and BL hardware: the BL OS runs on top of BL VMM, and BL VMM runs on top of BL hardware. Since BL hardware also include traditional hardware, BL VMM supports both network scheduler for conscious engine, as well as parallel scheduler for traditional CPU. Therefore, Both of BL engine OSs and traditional OSs can run on top of BL VMM.

Based on existing chaos concept or subject experience, via micro emergence model, the BL VMM generates new concept, called Brain-like Concept Entity, or BCE. BCE is influenced by attention, entangled in the BL emulator, cognized and evaluated in the conscious engine OS. It is then saved in a Brain-like Concept Network, or BCN. In BCN, it becomes subjective experience, and its related meta data and state values are updated by virtual brain-like state machine (VBSM). The subject experience again enters into the cycle and is used by BL VMM to generate new concept via micro emergence model. The cycle continues to make the concept mature and to evolve into a train of concepts or concept streams.

Brain-like Autonomic Computing System

Brain-like computing virtualization method is the foundation of unconscious and conscious engines. On top of these two engines, multi-layer application systems are built respectively. The traditional autonomic management processes MAPE are multi-layer applications for unconscious engine: from the lower layer monitoring→analysis→planning→to execution at the upper layers. However these application layers can be helped by corresponding conscious application layers, via external cycle, internal cycle and inner cycle of the autonomic computing. The help includes data mining, meaning analysis, creative decision engineering, and creative execution of the conscious layers.

BL Performance Service System of Multi-Core Computing Cluster

Optimization of the performance of multi-core computing cluster may be realized by installing adiabatic quantum computing gadgets on one of the computers in the cluster. The algorithm of optimization can be improved from existing method via BL computing virtualization. BL VMM can be installed at every node of the cluster. The performance data can be sent to the adiabatic gadgets for computation via communication amongst BL VMMs. The workload of each machine can then be adjusted creatively in time.

BL Software Development System and Service Delivery System

The BL computing virtualization method is applied to software development system and service delivery system of the information industry. The subsystems of the two said systems have characters of strong emergence, secondary strong emergence, weak emergence and secondary weak emergence which are emphasized and treated by attention in BL emulator, such that the success rate of the two systems can be elevated. The micro emergence model and macro emergence model each provides services to evaluate BCE intelligence grade.

BL Disaster Recovery System

In a BL disaster recovery system, the unconscious engine application layers are assisted by the creative ideas from corresponding conscious engine application layers. The assistance includes application layers like black swan theory, decision engineering and critical execution. During peace time or disaster time, BL OS and BL VMM migrate via quantum communication. BL OS includes traditional virtual machine and quantum virtual machine.

BRIEF DESCRIPTION OF DRAWINGS

The most objective way to explain the embodiments of the invention is to use the following diagrams, either in the format of block diagram or flow chart. For those skilled in the art, it is obvious from the detailed description of the preferred embodiments, referenced by the following diagrams, to understand the purposes, characteristics and advantages of the invention.

FIG. 8A is the analogy diagram of sending message and quantum consciousness, explaining with clip arts, the analogy between the two;

FIG. 8B is the analogy diagram of receiving message and quantum consciousness, explaining with clip arts, the analogy between the two;

FIG. 8C is the flowchart of intelligence grade elevator, which is an embodiment of FIG. 8A and FIG. 8B;

FIG. 13 is the flowchart of BL memory, explaining the boxes 200223 and 100224 of FIG. 10, and the box 308 of FIG. 3;

FIG. 14A is the architecture diagram of the macro emergence model of BL OS, explaining the boxes 100221 & 100222 of FIG. 10;

DETAILED DESCRIPTION OF THE PREFERRED EMBODIMENTS

The disclosed invention can be divided into method invention and system invention as in the following table:

| Primary | Secondary | Invention Contents |
| --- | --- | --- |
| BL computing virtualization methods | Foundation method | (FIG. 1, 2) Use Cyclic method to generate BCE node for BCN, including (FIG. 3-8, 10-13) BL VMM and BL engine: unconscious engine, conscious engine and affective engine |
| | Quantum gate method Quantum Adiabatic method | (FIG. 9A) Quantum Gate model for BL Emulator (FIG. 9B) Quantum Adiabatic model for BL Emulator |
| BL Computing virtualization Systems | | (FIG. 15) BL Autonomic computing system (FIG. 16) BL performance service system for multi-core computer cluster (FIG. 17) BL software development and service delivery system (FIG. 18) BL disaster recovery system |

BL Computing Horizontal and Vertical Architecture

Figure 1:
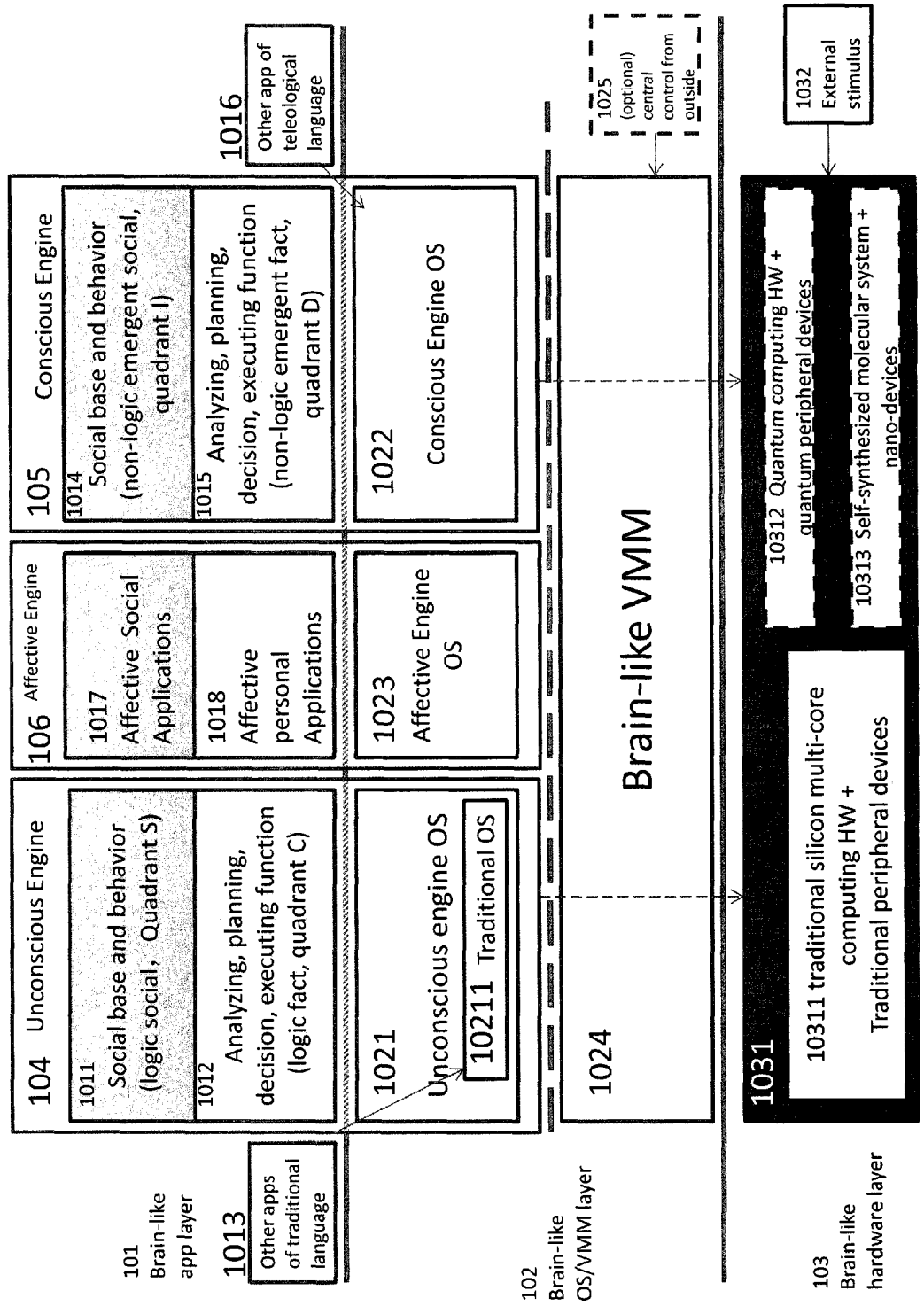
FIG. 1 is the architecture diagram of BL computing application layer, OSNMM layer and hardware layer.

FIG. 1 is a BL computing horizontal and vertical architecture block diagram of an embodiment based on the disclosed invention. The horizontal architecture includes three layers: 102 BL/VMM layer, 101 BL application layer, and 103 BL hardware layer. (1) BL OSNMM comprises two sub-layers OS and VMM, separated by dotted line. It is the central idea of the disclosed invention, shown as white boxes. Beneath the dotted line is box 1024 BL VMM, optionally accepting 1025 external control. Above the dotted line are three operating systems: box 1021 unconscious engine OS, 1022 conscious engine OS and 1023 affective engine OS, simultaneously running on top of BL VMM. (2) BL application layer comprises 4 quadrants: D-quadrant (dominant), I-quadrant (informational), S-quadrant (Stable), and C-quadrant (Compliant). They represent 4 human psychological characters, caused by human split brain and attitudes facing external "person (social)" or "facts". In other words, a person of D-quadrant has strong capability to use right brain to handle abstract facts, a person of I-quadrant has strong capability to use right brain handles abstract social activities, a person of S-quadrant has strong capability to use left brain to handle social details, and the person of C-quadrant has strong capability to use left brain to handle details of facts. The disclosed invention contains more embodiments of facts application, shown in light gray boxes; it contains less embodiments of social application, shown in the dark gray boxes. (3) BL hardware layer is not emphasized in this invention, shown as black box, but still related closely to BL OSNMM layer. For example, box 1031 of hardware layer comprises three kinds of hardware, box 10311 traditional silicon multi-core computer hardware and its peripherals, box 10312 quantum computing hardware and its quantum devices, and box 10313 artificial synthesized molecular computer and its nano-device. Quantum computer and molecular computer will have potentially large commercial applications, and will combine with traditional computer in some format. Initially this combination may be loosely-coupled where traditional computer and quantum/molecular computer are separate entities connected with fast communication links. Later on, there may be tight-coupled combination, say, forming one CPU/peripheral, and including a unified assembly instruction set for both traditional computing and quantum computing. The details of OS/VMM design may also influenced by loose-or-tight coupling of hardware, but the general idea (such as virtualization) still works. For example, the below-mentioned unconscious engine OS 1021 in near-term runs on top of traditional OS 10211 and can be regarded as an application of traditional OS. However in the future when unconscious engine OS and traditional OS is unified, then the unified OS may run application of traditional computer language 1013, as well as unconscious engine applications 1011 and 1012.

The Vertical architecture comprises three engines: affective engine, unconscious engine, and conscious engine. (1) Affective engine plays a prominent role for BL system to differentiate from other biological evolving system. People may regard it as part of conscious engine, but here it is an independent entity, because the frame and emotion of affective engine relates to free will or attention, and attention influences the consolidation of chaos concept of unconscious engine, as well as the intelligence elevation of subject experience of conscious engine. For (2) unconscious engine and (3) conscious engine, the word "consciousness" is used instead of "awareness", because the two may be close in meaning, but consciousness can be easily understood as closely relating to our daily life, e.g. we make conscious decision, and perform conscious work, and experience conscious life every second. Similarly "unconsciousness" can be easily understood from our daily life, e.g. swimming, driving, bicycling or any other routine tasks that are so familiar that no conscious mind is needed to handle. The two engines are roughly mimicking the split brains theory suggested by Nobel Prize winner Roger Sperry, where the left brain specializes logic, right brain specializes creativity, and the functional distinction is not absolute (e.g. the left brain may substitute an injured right brain in function, even if the substitution may not be very effective). The communication between two brains or two engines is emphasized here, too. The term "BL engine" is used hereafter for any of these three engines.

Therefore, vertically, box 104 is unconscious engine, a software engine, comprises two kinds of applications: box 1011 social base and facts (logic social, S-quadrant), and box 1012 analyzing, planning, decision making and executing function (logic facts, C-quadrant), and box 1021 unconscious engine OS, on top of which the two kinds of applications run. Box 105 is conscious engine, a software engine too, comprises two kinds of applications: box 1014 social base and behavior (non-logic social, I-quadrant), box 1015 analyzing, planning, decision making, and executing function (non-logic emergent facts, D-quadrant), and box 1022 conscious engine OS, on top of which the two kinds of applications run. In addition, box 106 is the affective engine, a software engine again, comprises box 1017 social affective application, box 1018 individual affective application, and box 1023 affective engine OS.

BL Computing Virtualization Method

Figure 2A:
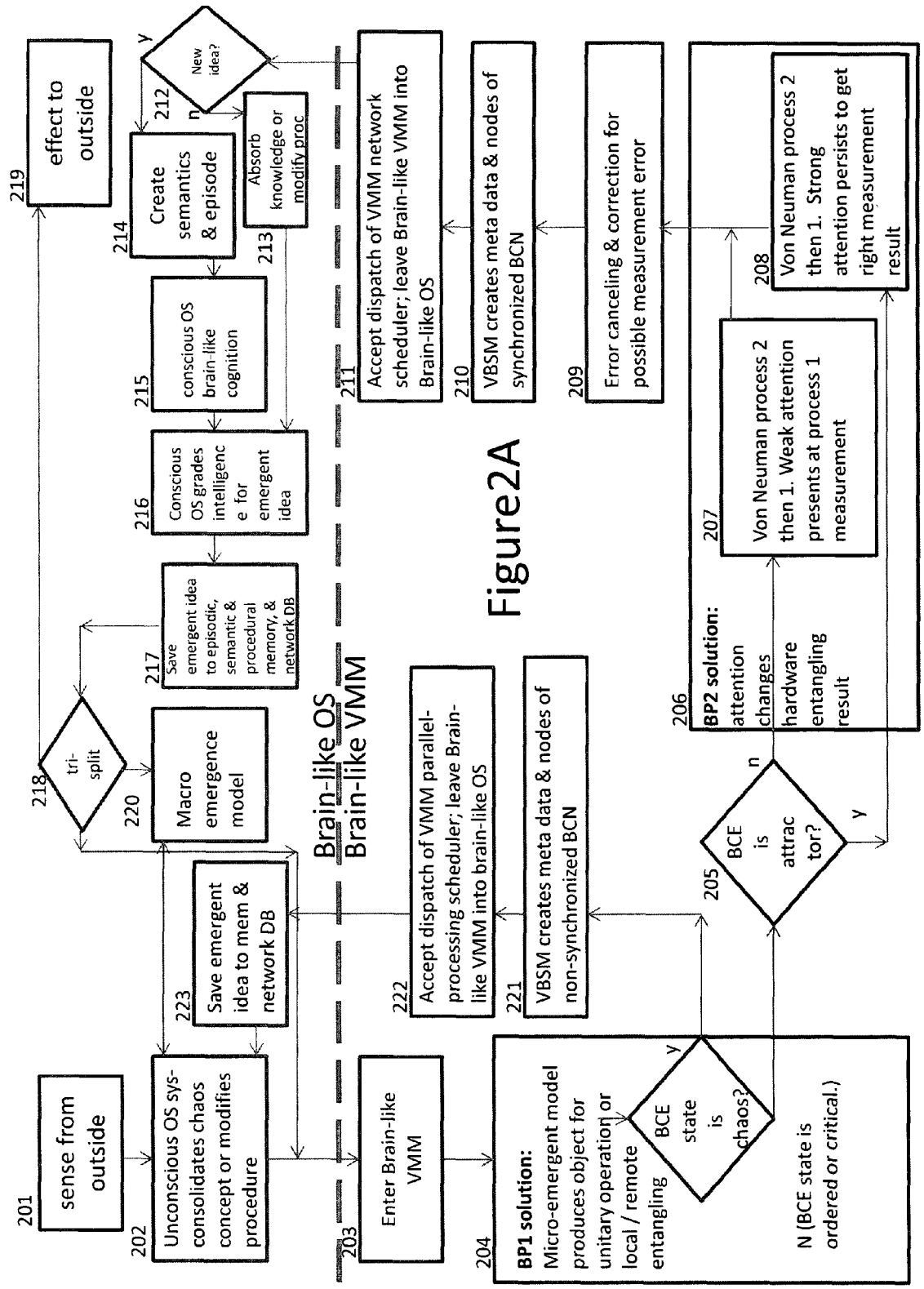
FIG. 2A is the flowchart of BL computing virtualization method, explaining FIG. 1 with flowchart.
Figure 2B:
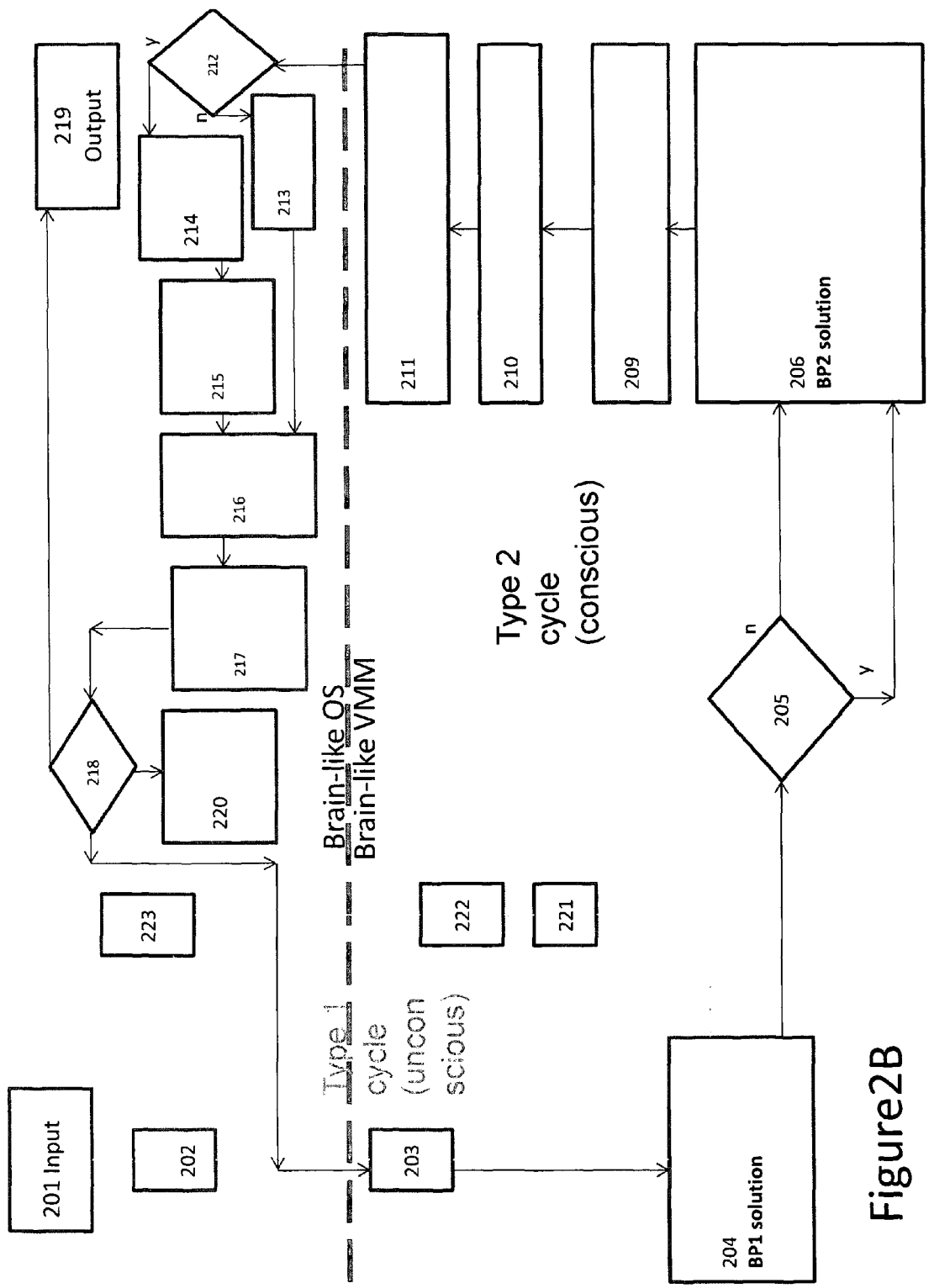
FIG. 2B shows the two types of BL cycles of FIG. 2A.

The architecture of FIG. 1 is realized by BL computing virtualization method, which relies on an automatically "re-entry" cycle to generate new concept, and to fulfill the purpose of generating BCE. FIG. 2 is the flowchart of the method. The idea of cycle is similar to the "Reentry" concept in the book "The Universe of Consciousness" written by Nobel Prize winner Gerald Edelman. However, Reentry refers to the actual, neurophysiologic entry while the said cycle of the disclosed invention refers to the looping of computer software: BCE relies on continuous cycle to become more abundant and more intelligent. There are two types of cycles in FIG. 2A: (1) Type 1 cycle, where most cycles are unconscious knowledge consolidation. Form FIG. 2A it is easy to see the type 1 cycle roughly includes the steps: 202→203→204→221→222→223→return to 202. Refer to FIG. 2B where type 1 cycle is illustrated with gray lines. (2) Type 2 cycle, or relatively less number of cycles experiencing the influence of attention from affective engine, the von Neumann processes of BL emulation, and the intelligence evaluation of BL cognition model, such that a meaningful, valuable, and conscious new concept is generated. From FIG. 2A it is easy to see the type 2 circle roughly includes 203→204→205→206→209→210→211→212→216→217→218→returns to 203. Refer to FIG. 2B where type 2 cycle is illustrated with black lines. (Note that the purpose of FIG. 2B hinges only on illustrating the rough outlook of the said two cycles. Therefore, most of the boxes in FIG. 2B have only number but no text of description. The number is the label of boxes in FIG. 2A, or the step number. To understand the meaning of each box in FIG. 2B, please return to FIG. 2A to read the text description in the corresponding box, or take the number in the box of FIG. 2B and read the description of steps below.) Step 201 is the optional input for the cycle, and step 219 is the optional output for the cycle. In FIG. 15 the BL autonomic computing system further describes how the sensor sends the input into system, and how the effector sends the output to the outside world, or generates effects internally.

Here is the workflow:

Step 201: Sense external stimulus, including text, graphics, audio, video, etc. Proceed to step 202;

Step 202: unconscious engine drives its consolidated chaos concept or modified routines into VMM, and processes external stimulus by object recognition module. Conscious engine drives its subjective experience into VMM. Proceed to step 203;

Step 203: enter BL VMM, receive chaos concept, modified routine, subjective experience, and processed external stimulus. Proceed to step 204;

Step 204 is BP1 solution, i.e. the employment of micro emergence model to generate object for unitary operation or local/remote entanglement. Determine if BCE state is chaos. If yes, it is passive attention, proceed to step 221. Otherwise, it is active attention; BCE state is ordered or critical. Enter BP2 solution. Proceed to step 205;

Step 205: determine if BCE is attractor. If yes, proceed to step 208. Otherwise, proceed to step 207;

Step 206 is BP2 solution, i.e. employment of attention to change hardware entanglement result. It comprises steps 207 and 208;

Step 207: enter von Neumann cycle, first von Neumann process 2 then process 1. No attention involved on process 1 when measuring. Proceed to step 209;

Step 208: enter von Neumann cycle, firstly von Neumann process 2 then process 1. Attention insists on process 1 when measuring. Proceed to step 209;

Step 209: cancel and correct possible errors. Proceed to step 210;

Step 210: virtual BL state machine (VBSM) creates meta-data and synchronizes BCN nodes. Proceed to step 211;

Step 211: Accept dispatch of VMM network scheduler; leave Brain-like VMM into Brain-like OS. Proceed to step 212;

Step 212: determine if BCE is new idea. If yes, proceed to step 214. Otherwise, proceed to step 213;

Step 213: Absorb knowledge or modify procedures. Proceed to step 216;

Step 214: Create semantics & episode. Proceed to step 215;

Step 215: Conscious OS brain-like cognition model. Proceed to step 216;

Step 216: Conscious OS grades intelligence for emergent idea. Proceed to step 217;

Step 217: Save emergent idea to episodic, semantic & procedural memory, & network DB. Proceed to step 218;

Step 218: in this tri-split switch, optionally output to step 219; optionally perform step 220. Reenter to step 203 of the cycle;

Step 219: effects to outside world, including the presence of text, graphics, audio, video, etc., also effects exerted system-internally;

Step 220: process macro emergence model. Interact with step 202;

Step 221: VBSM creates meta-data & nodes of non-synchronized BCN. Proceed to step 222;

Step 222: Accept dispatch of VMM parallel-processing scheduler; leave Brain-like VMM into brain-like OS. Proceed to step 223;

Step 223: Save emergent idea to memory & network DB. Return to step 202.

Notice that the dash line of FIGS. 2A and 2B divides the steps of BL OS and steps of BL VMM.

Brain-like VMM

Figure 3:
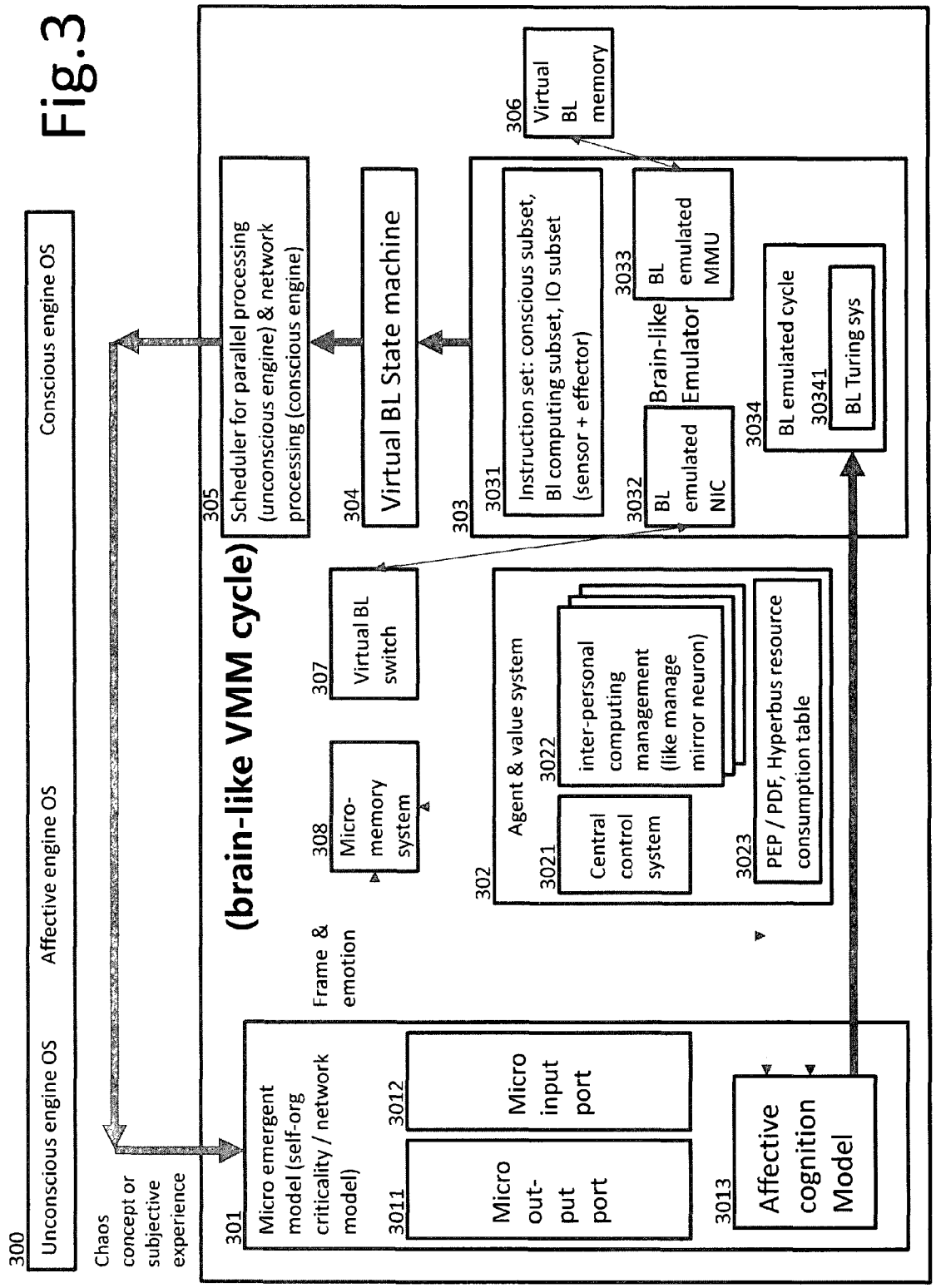
FIG. 3 is the architecture diagram of BL VMM, explaining the details of box 1024 of FIG. 1.

FIG. 3 is the architecture diagram of BL VMM, explaining the details of box 1024 of FIG. 1. The cycle of BL VMM is illustrated by thick arrow line, & comprises several important VMM components. The arrow cycle explains FIG. 2 flowchart from a different angle. VMM cycle is nested: there can be sub-cycles inside of the cycle (e.g. BL emulator sub-cycle in the BL VMM cycle, and BL Turing machine sub-cycle in emulator sub-cycle).

Box 300 of this figure is the upper layer OSs running on top of BL VMM. The layer comprises unconscious engine, conscious engine and affective engine. In particular, the affective engine outputs psychological frame and emotion to BL VMM. Frame is a cognitive bias towards gain and loss. Emotion comprises human hatred, fear, anger, sadness, and happiness.

Box 301 micro emergence model is a major component of BL VMM. The model accepts chaos concept from unconscious engine or subjective experience from conscious engine, forms BCE node of BCN via self-organized criticality (SOC) model. Box 301 also comprises box 3011 micro output port, 3012 micro input port, and 3013 Affective Cognition Model (ACM). Micro output port refers to the port through which the conscious engine sends message to unconscious engine (always view from conscious engine); micro input port refers to the port through which the unconscious engine sends message to conscious engine; ACM accepts psychological frame and emotion from affective engine OS, as well as the new BCE information from SOC model. ACM digests the two inputs and then sends them to box 303, the BL emulator.

Figure 6:
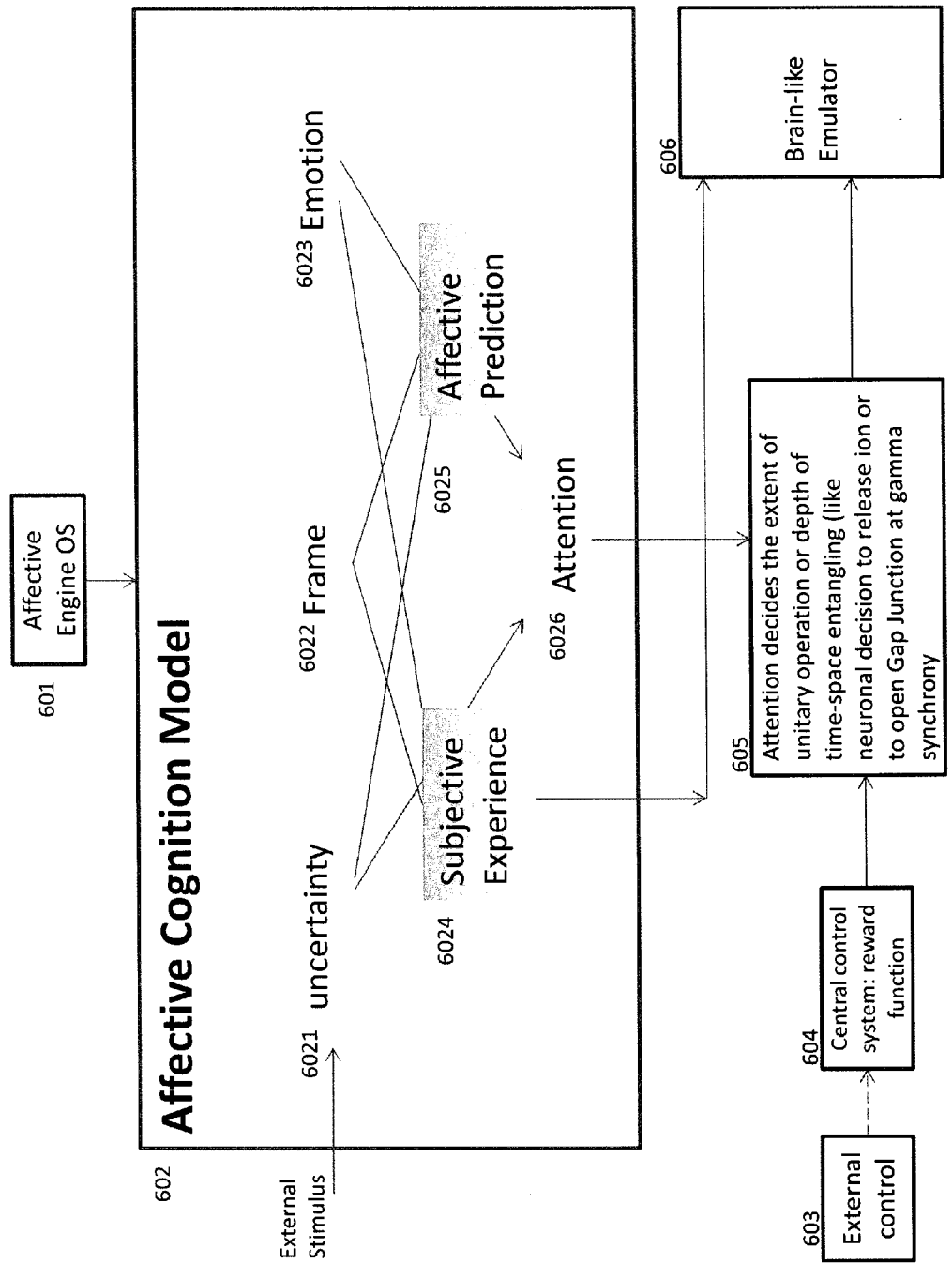
FIG. 6 is the architecture diagram of the attention/subjective experience operational model, explaining the box 3013 of FIG. 3.

Box 302 is the agent and value system, comprising box 3021 central control system, detailed in the boxes 603, 604 & 605 of FIG. 6. Box 3022 is the interpersonal computing manager, like managing mirror neuron. The multiple boxes behind it signal multiple persons or selves are managed where the composition of the 3 OSs in box 300 represents a person or self. Box 3023 is policy decision function (PDF), policy execution point (PEP), and Hyperbus resource consumption table, detailed in Tang patent application U.S. Ser. No. 13/115,341, "kernel bus system to build Virtual Machine Monitor and the performance service framework & Method therefore".

Box 303 BL emulator comprises:

(1) Box 3031 BL instruction set comprises BL computing instruction subset, Conscious instruction subset, & IO (sensor and effector) instruction subset. BL computing instruction subset comprises molecular computing or quantum computing CPU instructions. Such CPU is not yet standardized, but those suggested instructions in Bettelli 2008 "Toward an Architecture for Quantum Programming" can be referenced. Conscious instructions and IO instructions concern with BL consciousness, comprising:

a) Instruction to dynamically add BCE: Substitute traditional CPU interrupt, to add BCE or BCN subnet to handle new concept(s). Thus the sync and async operations are avoided. The "interrupt substitution" is a major distinction from traditional computer;

b) Instruction to convert data from digital bit to qubit: traditional digital (0 and 1) data is able to convert to qubit data, and vice versa. If necessary, traditional digital data is first converted to data of molecular and/or atomic computing, and then converted to qubit data, and vice versa.

c) Instruction to generate BCE: OS may use the instruction to generate BCE. For quantum computing, this may happen when current BCE entangles with a local or remote BCE, e.g. the two concepts "blue" and "square" are linked. The two objects in the box are able to know what is above the box. Thus a new subjective experience is generated. Whether the entangled result is justified will be determined by the capability of SOC model, as well as the result of the evaluation by BL cognition;

d) Instruction to consolidate unconscious chaos concept: Unconscious engine may use the instruction to consolidate chaos concepts, like neuronal firing and integration in a non-sync network;

e) Instruction to input Subjective experience: as the input to von Neumann process 2 of the BL Turing machine;

f) Instruction to input Attention: as the input into the BL Turing machine. Attention represents external character of the person measuring the quantum experiment;

g) Instruction to entangle BCE;

h) Instruction to switch mode of BL VMM and BL OS;

i) Instruction subsets to interface with BL VMM kernel, comprising the mode switch of BL VMM kernel and BL emulator at the BCN for the loosely-coupled design, interface of the emergence mathematical model to outside world, including self-similar interface, and the micro input and output ports;

(2) Box 3032 BL emulator communication;

(3) Box 3033 BL emulation memory management unit (MMU). This is the emulation of MMU for the BL emulator;

(4) Box 3034 BL emulator cycle, including BL Turing machine. See FIG. 9 for details;

Box 304 is VBSM. See FIG. 7 for details;

Box 305 is the scheduler of parallel processing (unconscious engine) and network processing (conscious engine). If unconscious engine runs on traditional CPU hardware, parallel scheduler may be the same as traditional VMM scheduler (e.g. the Linux KVM schedulers running on X86 CPU (i.e. also the scheduler for Linux OS)). In other words, if BL VMM detects its hardware environment and OS environment are traditional environment, it automatically reduces to traditional VMM. One way of reducing is when determination is made in step 204 of FIG. 2, the logic may simply close the selection path for "BCE state is not chaos". When BL VMM detects its hardware environment is able to run BL emulator and conscious engine OS (e.g. there exists a gate-model quantum computer or simple adiabatic computing gadgets), step 204 re-opens the selection path "BCE state is not chaos" for the scheduler of network processing to work. The scheduler of network processing is able to schedule amongst multiple BL OS sets and multiple traditional OSs to adjust the BL hardware usage;

Box 306 is virtual BL switch, providing address operations to communicate with outside world for BL hardware, using software methods.

Box 307 is virtual memory;

Box 308 is micro memory system. The system accepts psychological frame and emotion from affective engine as inputs. The system uses dynamical degeneration to input ("write") information using multiple processes, and realizes re-appearance ("read") via degeneration;

FIG. 3 reflects the design approach of BL VMM. If the combination of micro emergence model and agent/value system is called BL VMM kernel, then loosely-coupled approach places said kernel outside of BL emulator, and in such an approach the BP2 solution of FIG. 2 is the BL emulator, and the von Neumann cycle of FIG. 2 is the BL Turing Machine. Median-coupled approach places said kernel inside of BL emulator but outside of BL Turing machine, and tightly-coupled approach places said kernel inside of BL Turing machine.

Micro Emergence Model

Figure 4:
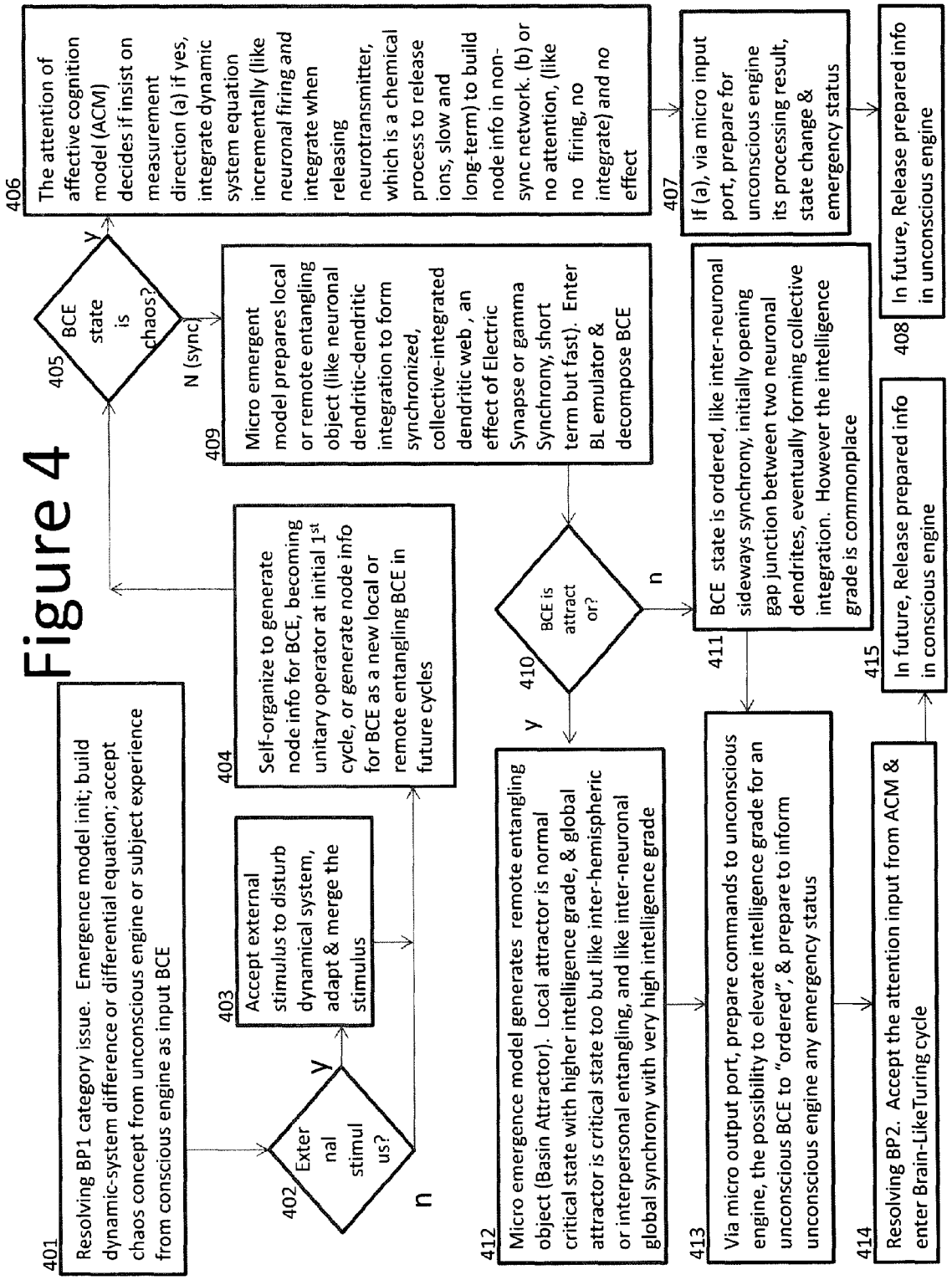
FIG. 4 is the flowchart of micro emergence model, explaining the step 204 of FIG. 2, and the box 301 of FIG. 3.

FIG. 4 is the flowchart of micro emergence model, explaining the step 204 of FIG. 2, and the box 301 of FIG. 3. The workflow follows:

Step 401: First, solve categorization problem of (BP1). Initialize micro emergence model; build the differential or difference equation of the dynamical system; accept the chaos concept from unconscious engine and subjective experience from conscious engine. Proceed to step 402;

Step 402: determine if there are external stimulus. If yes, proceed to step 403. Otherwise, proceed to step 404;

Step 403: Accept external stimulus as the disturbance of the dynamical system. Adjust dynamical system. Proceed to step 404;

Step 404: Self-organize to generate node info for BCE, becoming unitary operator at initial $1^{st}$ cycle, or generate node info for BCE as a new local or remote entangling BCE in future cycles. Proceed to step 405;

Step 405: determine if BCE state is chaos. If yes, proceed to step 406. Otherwise, proceed to step 409;

Step 406: The attention of affective cognition model (ACM) decides whether to insist on measurement direction: (a) if yes, integrate dynamic system equation incrementally (like neuronal firing and integrate when releasing neurotransmitter, which is a chemical process to release ions, long-term and slow) to build node info in non-sync network. (b) Or no attention, (like a neuron with no firing, and no integration) and no effect. Proceed to step 407;

Step 407: In case of (a), prepare for unconscious engine its processing result, state change & emergency status via micro input port. Proceed to step 408;

Step 408: In the future, release prepared info in unconscious engine;

Step 409: Micro emergent model prepares local or remote entangling object (like neuronal dendritic-dendritic integration to form synchronized, collective-integrated dendrite web, an effect of Electric Synapse or gamma Synchrony, short term but fast). Enter BL emulator & decompose BCE. Proceed to step 410;

Step 410: determine if BCE is attractor. If yes, proceed to step 412. Otherwise, proceed to step 411;

Step 411: BCE state is ordered, like inter-neuronal sideways synchrony, initially opening gap junction between two neuronal dendrites, eventually forming collective integration. However the intelligence grade is commonplace. Proceed to step 413;

Step 412: Micro emergence model generates remote entangling object (Basin Attractor). Local attractor is normal critical state with higher intelligence grade, & global attractor is critical state too but like inter-hemispheric or inter-personal entangling, and like inter-neuronal global synchrony with very high intelligence grade. Proceed to step 413;

Step 413: Via micro output port, prepare commands to unconscious engine, the possibility to elevate intelligence grade for an unconscious BCE to "ordered" state, & prepare to inform unconscious engine any emergency status. Proceed to step 414;

Step 414: Resolving BP2. Accept the attention input from ACM & enter Brain-Like Turing cycle. Proceed to step 415;

Step 415: In the future, release prepared info in conscious engine.

Cyclic Emergent BL Concept Network

Figure 5:
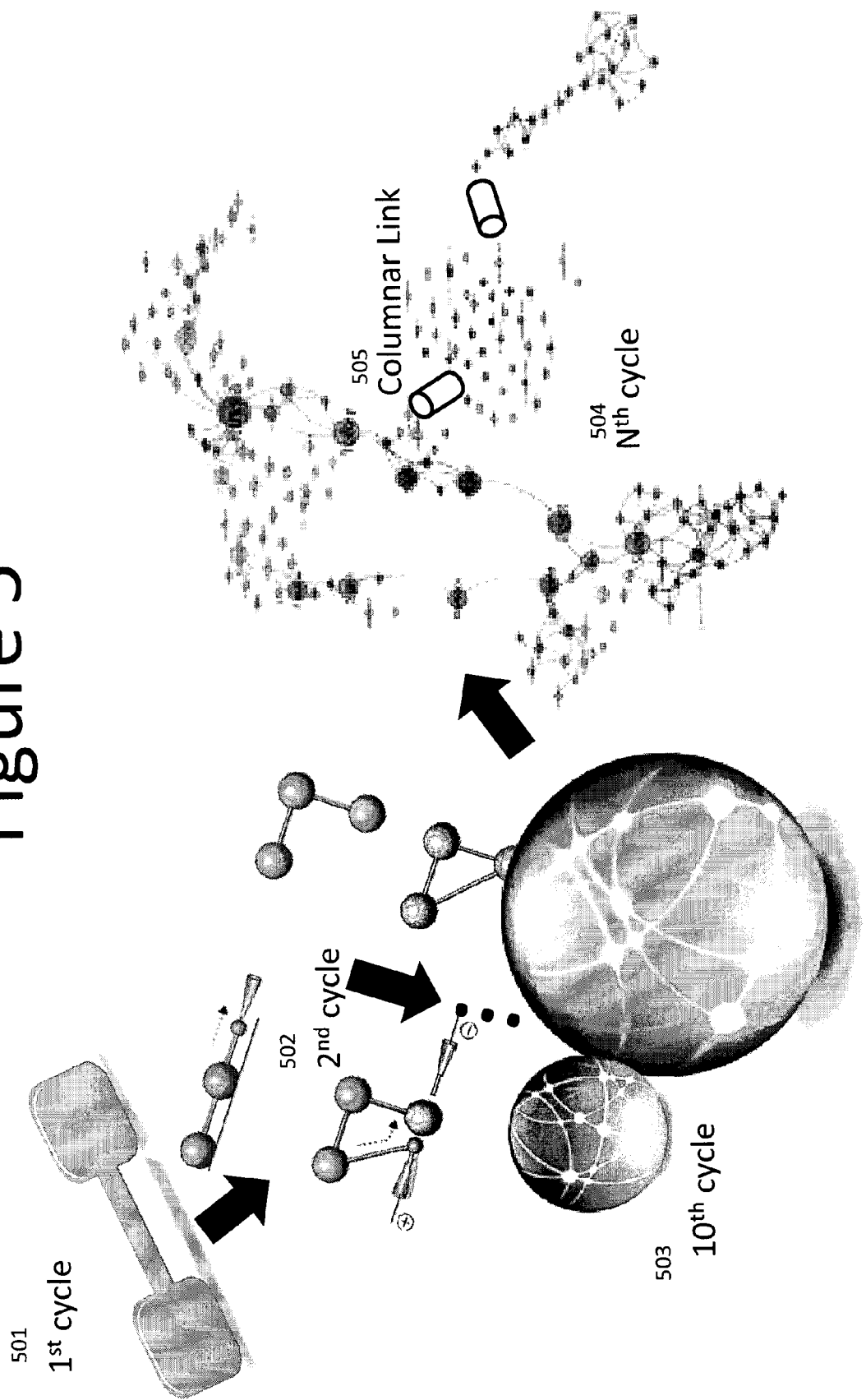
FIG. 5 is the cyclic structural diagram of BL concept network (BCN), explaining, with clip arts, the various stages of the multi-cycling FIG. 3 in order to form BCN.

FIG. 5 is the architecture diagram of cyclic BL concept network (BCN), explaining, with clip arts, the various stages of the multi-cycling FIG. 3 in order to form BCN. Multiple BCNs are concurrent, meaning there are many BCNs running at the same time. BCN may be sideways connected to other networks of different layers and different dimensions via "columnar link". Each BCE in the network may be in a primary state of chaos, ordered, or critical. For human brain, chaos BCE means individual neuron firing and integration without conscious thinking. Ordered or critical BCEs gradually self-organize into network of conscious thinking and vibrate at same frequency, similar to the gap junction between human brain neurons reaching neighboring neurons by sideways synchrony, and eventually reaching global synchrony of inter-hemispheric communication or interpersonal crossing. BCN may be modeled with emergence mathematical model. For example, the Kuramoto model is suitable for synchronized dynamical network to compute order parameter in order to determine the said three primary states. Improvement of Kuramoto model is needed to model neuronal non-linear behavior. The Hodgkin-Huxley (HH) model, on the other hand, is more practical and specifically built to match neuronal behavior. HH model is able to cover both synchronized (conscious) neuronal network, as well as spiking-only non-synchronized (unconscious) network.

The figure emphasizes the stage-wise expansion of the network, from single BCE's unitary operation, to a network formed by two entangled BCEs (501), to 3 BCEs (502), 4 BCEs, . . . 10 BCEs (503). The increase of nodes is the result of one or more BL VMM cycles. The network (BCN) may be three-dimensional, or mathematically N-dimensional (504) where N>=3. Notice some cycle may start again from a single BCE operation, thus a new network. At some point in time this new network connects with the previously-generated network by "columnar link" (505).

The node (BCE) of the network is generated and initialized by micro emergence model, and validated, filtered by other models; eventually the existence of the node and its location in the network are confirmed.

The importance of transient synchrony: Transient synchrony determines exactly how a train of emergent concepts are connected, whether they use the same frequency, and whether the inter-network sideways connection builds more advanced intelligence grade rather than trash ideas. These are similar to the gamma synchrony of the human brain neuronal interactions. The said HH mathematical models are normally improved to resolve neurophysiologic and practical clinical problem. In the BL computing environment, the improvement of the said mathematical models may also assist the BCE state elevation, which elevates the intelligence grade.

Operational Model of Attention and Subjective Experience

FIG. 6 is the architecture diagram of the operational model of attention and subjective experience, explaining box 3013 of FIG. 3.

Firstly, the psychological frame and emotion from affective engine OS become the input to this operational model (for the details of these inputs, see the technical explanation of box 300 of FIG. 3).

The operational model of attention/subjective experience may also be termed 602 Affective Cognition Model (ACM). For details of ACM please see Hyung-il Ahn 2010 MIT PhD thesis "Modeling and Analysis of Affective Influences on Human Experience, Prediction, Decision Making, and Behavior". The architecture of ACM influences the 6026 choice behavior of a decision maker under 6021 uncertainty (caused by external stimulus), 6022 psychological frame, and 6023 emotion. The architecture extends the Prospect Theory (PT) of Nobel Prize winner and economy-psychologist Daniel Kahneman. It also extends the reinforcement learning (RL) theory to how affection influences the behavior of decision and decision maker.

ACM extends PT-based subject value function to empirical-utility function, and predictable-utility function, with the assumption that in continuous decision making, the shapes and parameters of these subjective value functions vary with the emotional situation and the confidence to tasks of the decision maker. Emotion states include fear, frightening, and economic worries.

The output of ACM is 605 the decision result, which is an attention resulted from sensible experiential judgment. The attention decides the time-space depth of BCE unitary operation or entanglement, similar to a neuron deciding whether to release neurotransmitter, or whether to open or close the gap junction of gamma synchrony. See S. Hameroff, "The "conscious pilot"—dendritic synchrony moves," *Journal of Biological Physics, p.* 71-93, 2010(36).

The operational model of attention/subjective experience also includes box 604 central control system. Box 605 the decision result is influenced by box 604 central control system. The influence is based on reward system, e.g. pavlovian reward function (see P. Dayan, "Chapter 2. Models of Value and Choice," 2010). Central control may optionally (shown in dash line) accept the external control. If we form a composite set of a unconscious engine, a conscious engine and an affective engine (equivalent to one individual brain), central control module is able to control multiple of such sets (equivalent to multiple person/multiple selves).

Box 6024 subjective experience and box 605 attention become the input to 606 BL emulator.

Virtual BL State Machine

Figure 7:
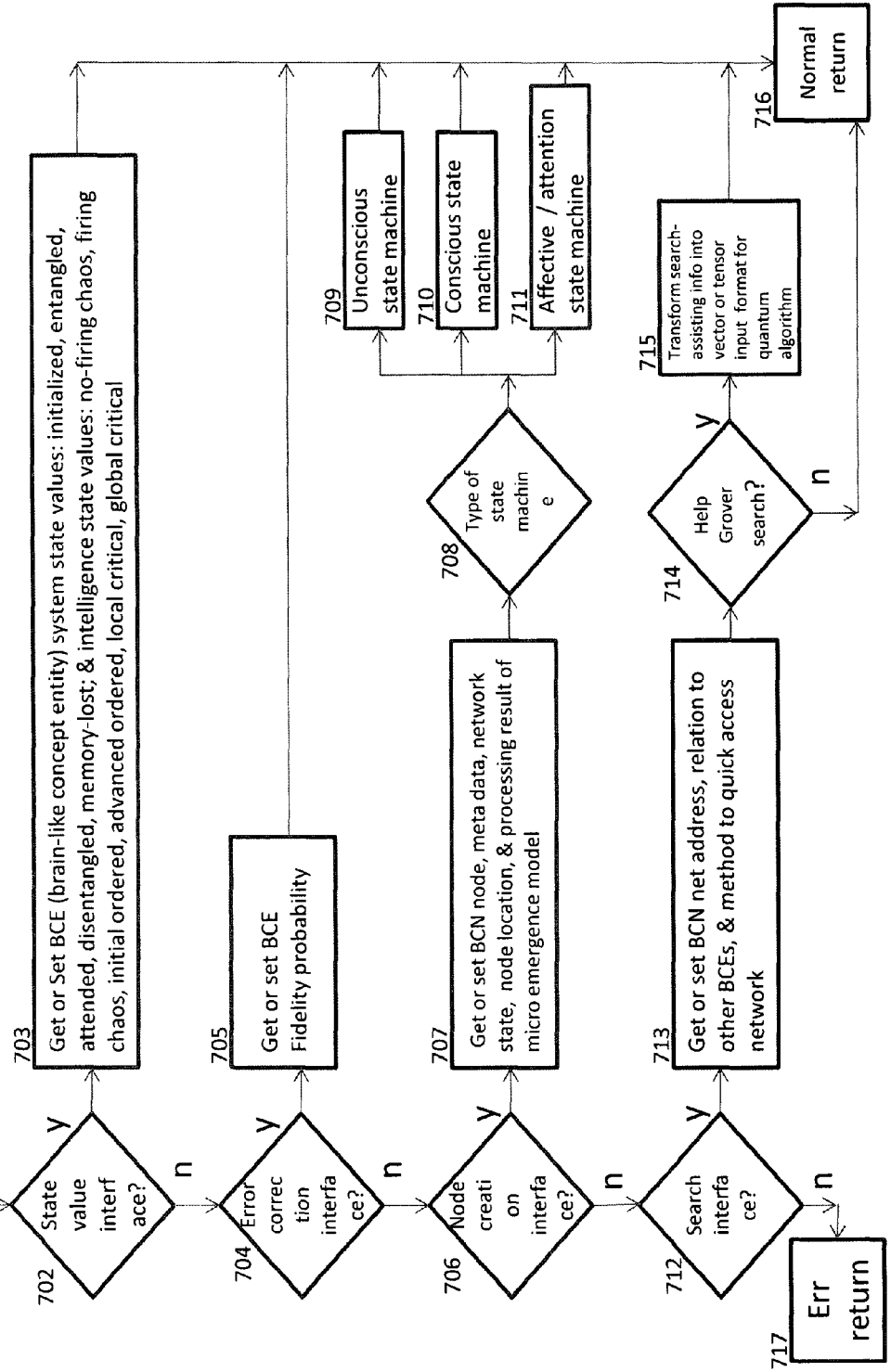
FIG. 7 is the flowchart of virtual BL state machine, explaining the box 304 of FIG. 3.

FIG. 7 is the flowchart of Virtual Brain-like State Machine (VBSM), explaining box 304 of FIG. 3. VBSM provides gets and sets of (1) BCE system state values: initialized, entangled, attended, disentangled, memory-lost; & intelligence state values: no-firing chaos, firing chaos, initial ordered, advanced ordered, local critical, global critical; (2) Fidelity probability for quantum computing; (3) meta data or data of building BCE as a node of BCN; and (4) meta data or data helping BCE database search. The workflow is as follows:

Step 701: VBSM initialization. Proceed to step 702;

Step 702: determine if interface for state value. If yes, proceed to step 703. Otherwise, proceed to step 704;

Step 703: get or set BCE system state values: initialized, entangled, attended, disentangled, memory-lost; & intelligence state values: no-firing chaos, firing chaos, initial ordered, advanced ordered, local critical, global critical. Proceed to step 716;

Step 704: determine if interface for error correction. If yes, proceed to step 705. Otherwise, proceed to step 706;

Step 705: set or get BCE Fidelity probability for quantum computing. Proceed to step 716;

Step 706: determine if interface for building network node. If yes, proceed to step 707. Otherwise, proceed to 708;

Step 707: set or get information of BCE network node, meta-data, network state, node location in the network, processing results from micro emergence model. Proceed to step 708;

Step 708: determine the type of VBSM state machine. If unconscious state machine, proceed to step 709. If conscious state machine, proceed to step 710. If affective/attention state machine, proceed to step 711;

Step 709: unconscious state machine operation. Proceed to step 716;

Step 710: conscious state machine operation. Proceed to step 716,

Step 711: affective/attention state machine operation. Proceed to step 716;

Step 712: determine if interface for search. If yes, proceed to step 713. Otherwise, proceed to step 717;

Step 713: Get or set BCN net address, relation to other BCEs, & method to quick access network. Proceed to step 714;

Step 714: determine if helping Grover search. If yes, proceed to step 715. Otherwise, proceed to step 716;

Step 715: Transform search-assisting info into vector or tensor input format for quantum algorithm. Proceed to step 716;

Step 716: normal return;

Step 717: error return.

The Analogy of Sending Message and Quantum Consciousness

FIG. 8A is the analogy diagram of sending message and quantum consciousness, explaining with clip arts, the analogy between the two.

When a commander 801 sends his messages, he dispatches the messages to many messengers 802. Each messenger carries many envelops 803, and each envelop contains lots of information 804.

Similarly, when we have chaos concept or past subjective experience accompanied by attention 805 (equivalent to the said commander's messages 801) to generate new BCE, neurotransmitter 806a deals with unconscious BCE which does not enter BL emulator. The tubulin 806b, on other hand, is able to enter BL emulator (both are equivalent to the said messengers 802). In BL emulator, tubulin BCE decomposes the new BCE into many ions or atoms 807 (equivalent said envelop 803). After entering BL Turing machine, each ion or atom has many electrons (quantum), and quantum state stores a lot of information 808 (equivalent to the said information 804);

Each process in the Figure decomposes its input into many outputs. Eventually the output breaks down to information. "Information" here means a BCE, which can be either an indecomposable concept unit (a node), or a decomposable concept group (an entire BCN or BCN subnet, i.e. a "train of thoughts", or a "thought steam" integrated from individual concept).

The figure illustrates the concept of "decomposing" or "categorizing". The figure also demonstrates the richness of information, which is obtained from different decomposition layers: the upper part above the thick line of FIG. 8A specifies 4 layers: commander, messenger, envelop, and information. The lower part below the thick line contains 4 other layers: unconscious chaos concept or conscious subjective experience plus attention; neurotransmitter (unconscious) or tubulin (conscious); ion or atom; quantum or concept. According to the quantum conscious theorists, there are $10^{11}$ neurons in a human brain. Every neuron has $10^3$ synapses, and every synapse transmits $10^2$ neurotransmitters per second. Therefore, the computing speed to handle human brain neurotransmitter is $10^{11} \times 10^3 \times 10^2 = 10^{16}$ per second maximally. "Maximal" means the most information being processed. On the other hand, there are $10^8$ tubulins in a neuron, and each tubulin vibrates at a rate of $10^7$ per second. Therefore, the computing speed to handle tubulins in an entire human brain is $10^{11} \times 10^8 \times 10^7 = 10^{26}$ per second, which can only be reached by quantum computer. The figure also shows that neurotransmitter does not enter BL emulator, but the tubulin which enters BL emulator, possesses a processing power $10^{26}/10^{16} = 10^{10}$ times that of neurotransmitter. From this estimation, it can be reasoned that in a human brain, the amount of information in conscious BCEs may be $10^{10}$ times that of unconscious BCEs.

Each of the primary BCE states: chaos, ordered and critical can be further divided into two secondary states: non-connecting chaos (equivalent to non-firing neuron), connecting chaos (equivalent to neuron firing and integrate), initial ordered, highly ordered, local critical, and global critical. The last four secondary states are equivalent to the states of neurons synchronized in the neural net. When elevating the intelligence grade of BCE, the information amount in BCE must increase exponentially, and must go over several thresholds between each 2 secondary states.

The Analogy Between Receiving Message and Quantum Consciousness

FIG. 8B is the analogy diagram of receiving message and quantum consciousness, explaining with clip arts, the analogy between the two.

When a message is received (809 in the figure) by a receiver, he or she first discriminates (810) the information, then interpret (811) the information, eventually take action (812) for the interpreted information.

Similarly, when an ion or electron realizes unitary operation or entangling (813) with other quantum (equivalent to the said receiving information 809), it is desired to determine if the measurement result is accepted, if the protocol needs to change, and if the information is selected (814, equivalent to the said discriminating information 810). When leaving BL emulator and BL Turing machine, the information is cognized, parsed, and meaning obtained (815, equivalent to the said interpreting 811). Eventually the information is merged, forwarded, propagated, or refused (816, equivalent to the said action 812 to the information).

The BCEs in FIG. 8B and FIG. 8A are the same BCE. It must be emphasized that the entangled BCEs must be quantum synchronized at same frequency. The farther the distance in BCNs between entangled BCEs, the more probable to have high intelligence grade, and to have risks of forming totally unreasonable BCE.

Intelligence Elevator

FIG. 8C is the flowchart of intelligence grade elevator, which is an embodiment of FIG. 8A and FIG. 8B. FIG. 8A sends out message, or the divergence of information; FIG. 8B receives message, or the convergence of information. Here a design principle called "degeneracy" is involved. Degeneracy is both divergent and convergent; it muxes the signals and demuxes the signals; it categorizes and discriminates/selects information.

The intelligence elevator of a BL computing system has tremendous commercial value. The elevator may use (1) degeneracy to exert influence for system internals. Under the principle of degeneracy, the system complexity and system robustness are characters of general biological evolving system. Complexity means the hierarchy of system structure which can be heterogeneous, and have nested subsystems. It has certain scalability, so that a system can be easily integrated or differentiated. As for robustness, the general engineering system that has global control mechanism and predictable redundancy can only be called pure robustness. The robustness of a biologically evolving system, on the other hand, comprises many components, which are built to fulfill system functions and are not fixed for assigned tasks: several different components can contribute together for one function of the system, while one component can contribute for several system functions. Moreover, some components look similar under certain condition, but are very different under other conditions.

More importantly, BL computing system is different from biological evolving system in that it has (2) free will. For BCEs in the system, free will or attention can drive the connecting capability, synchronizing capability, regularity capability, attractor-formation capability, and the capability to unite multiple attractors. Attention also facilitates the system to adapt to (3) external stimulus, which may increase system uncertainty and system disturbance.

The workflow steps of intelligence elevator are:

Step 820: Intelligence elevator initialized, & attention affected by outside stimulus. Proceed to step 821;

Step 821: determine if BCE state is non-connecting. If yes, proceed to step 822. Otherwise proceed to step 824;

Step 822: Attention promotes BCE connecting ability (equivalent to neuronal firing the integration) & number of related BCEs. BCE connection threshold passed. Proceed to step 823;

Step 823: BCE state elevated to connection chaos: complexity from 0 to low; robustness from 0 to pure redundancy without functional plasticity but with redundant system buffers, & attention agent can only participate in system responses related to a few tasks. Proceed to step 824;

Step 824: determine if BCE state is connecting chaos. If yes proceed to step 825. Otherwise, proceed to step 827;

Step 825: Attention promotes connecting & synchronizing abilities of other related BCEs; BCE sync threshold passed. Proceed to step 826;

Step 826: BCE state is elevated to initially-ordered: complexity increases from low, robustness changes from pure redundancy to pure redundancy with functional plasticity, meaning multiple attention agents are degenerated but only similar in one type of task. Proceed to step 827;

Step 827: determine if BCE state is initial ordered. If yes, proceed to step 828. Otherwise, proceed to step 830;

Step 828: Attention promotes BCE regularity, BCE ordered threshold passed. Proceed to step 829;

Step 829: BCE state elevated to highly synch: complexity keeps increasing; robustness changes from pure redundancy with functional plasticity to functional redundancy, meaning the end state of task reassignment, but begin of resource reconfiguration; or tasks in one functional group increases while tasks of another group decreases. Resource of $1^{st}$ group is supported by $2^{nd}$ in-excess group via reassignment pathway. Proceed to step 830;

Step 830: determine if BCE state is highly ordered. If yes, proceed to step 831. Otherwise, proceed to step 833;

Step 831: Attention facilitates to form basin attractor. BCE critical threshold passed. Proceed to step 832;

Step 832: BCE state elevated to local critical: complexity from low to high, robustness changes from functional redundancy & is added with functional plasticity to become local degeneracy, meaning resource reconfiguration is large via different reassignment pathways. Meanwhile, the award function of attention agent encourages the boldness to innovate. Proceed to step 833;

Step 833: determine if BCE state is local critical. If yes, proceed to step 834. Otherwise, proceed to step 837;

Step 834: Attention facilitates convergence of BCE basin attractors. BCE global threshold passed. Proceed to step 835;

Step 835: BCE state elevated to global critical: complexity from high to extremely high, robustness from local degeneracy to global degeneracy, meaning concurrent multi-networks, and distributed responses involving chains of mutually degenerate attention agents. Meanwhile, the award function of attention agent encourages the boldness to innovate, thus auto-catalyzes the intelligence elevation. Proceed to step 836;

Step 836: normal return;

Step 837: error return.

The above steps illustrate how the intelligence elevation of BL system uses degeneracy and attention to response to external stimulus, and elevates intelligence grade at the same time. Step 835 of intelligence elevator can also utilize the principle of autocatalysis to realize the automatic acceleration of intelligence elevation, similar to a "molecular switch" in a biological evolving system, to release the hidden multiplying gene, and eventually facilitate the rapid burst of innovation.

BL Emulator Cycle and BL Turing Machine Cycle of a Quantum Gate System

FIG. 9 is the system diagram of cyclic quantum gate model of BL emulator and BL Turing machine, emulating quantum computer device "quantum gate" to realize FIG. 8A, FIG. 8B and FIG. 8C.

A quantum gate system employs quantum gate to complete the BL computing virtualization method. Quantum gate system employs a large amount of quantum gate resources in quantum computer to realize computation. In contrast, quantum adiabatic system uses quantum algorithm transformation and takes only a few gates to realize computation. These two systems are embodiments that may be generalized to other traditional or molecular computing systems.

In terms of design style, FIG. 9 shows a loosely-design style. However, this embodiment can use medium-coupled design to include BL VMM kernel (micro emergence model+ACM) into BL emulator or tightly-coupled design into BL Turing machine. This can be so due to technological advances and consideration of resource cost. For example, if it is less costly to run VMM kernel on top of cheaper traditional CPU instead of more expensive quantum computing resources, the kernel can be loosely designed outside of BL emulator. However, there may be performance reasons to run the kernel inside of emulator.

One important concept when designing quantum gate or quantum adiabatic system is that, due to the theory proposed by Feynman 1980, a quantum algorithm cannot run effectively on traditional computer, and must run on quantum computer hardware. In other words, the emulator has to be a simulator when using quantum gate or adiabatic quantum model. The traditional computing system or molecular computing system is not restricted to Feynman's theory.

The physicist Henry Stapp of UC Berkeley extends von Neumann quantum process 1 and 2 by adding process 0 and process 3. The resulting processes from 0 to 3 are called vNs processes. In FIG. 9, the box 90 is BL emulator cycle (gate model), illustrated by 4 thick arrow lines. The definition of the 4 processes in vNs is: (1) vNs process 0: A BL system continuously finds the next chaos concept from unconscious engine, and subjective experience from conscious engine, accompanied by box 91 attention to enter sub-cycle, or step 904, the BL Turing machine cycle, (2) vNs process 2: also known as von Neumann process 2, where quantum unitary operation or quantum entanglement generate new BCE; (3) vNs process 3: also known as von Neumann process 1, where BL system measures the result of quantum unitary operation or quantum entanglement. BL Turing machine constantly cycles the above von Neumann process 2 then process 1, builds network nodes, and after the information is discriminated, sends it to conscious engine OS were the vNs process 3, is run. (4) vNs process 3: quantum cognition, detailed in FIG. 11. For the detailed contents of von Neumann process 1 and 2, please refer to Schwartz 2004 paper "Quantum physics in neuroscience and psychology: model of mind-brain interaction". Notice the results of these two processes must go through the determination of attention. If the result of process 1 is not satisfactory, other BCEs are tried and re-entered into process 2 and then process 1 for measurement. It is an inventive idea of this disclosed patent where such continuous cycling (called von Neuman cycle) is repeated until a satisfactory result determined by attention is reached.

Box 921 indicates a different adiabatic model may be used to replace gate model so that traditional computer and few quantum gates are used to simulate computation. Box 922 indicates the BL VMM kernel may be designed inside of BL Turing machine, which is a tightly-coupled design. Or, placing the kernel inside emulator but outside of Turing machine, which is a median design.

Here are the steps of the BL emulator cycle:

Step 901: accept ACM output subjective experience. Proceed to step 902;

Step 902: Decompose quantum error correction to logical qubits & logical quantum gates. Proceed to step 903;

Step 903: Maintain virtual qubits & gates with emulated physical control sequences. Proceed to step 904;

Step 904: BL Turing machine cycle, comprises the following sub-steps:

Sub-step 9041: Store physical quantum information. Proceed to sub-step 9042;

Sub-step 9042: Von Neumann process 2: unitary operation or entangling. Proceed to sub-step 9043;

Sub-step 9043: Von Neumann process 1: physical measurement. Proceed to sub-step 9044;

Sub-step 9044: determine if continues the cycle. If yes, return to sub-step 9041. Otherwise, proceed to step 905;

Step 905: logical measurement & error cancellation. Proceed to step 906;

Step 906: braiding/Error correction. Proceed to step 907;

Step 907: send the info to conscious engine to evaluate the BCE via emulated quantum switch.

Cyclic Adiabatic Quantum Model of BL Turing Machine

Figure 9A:
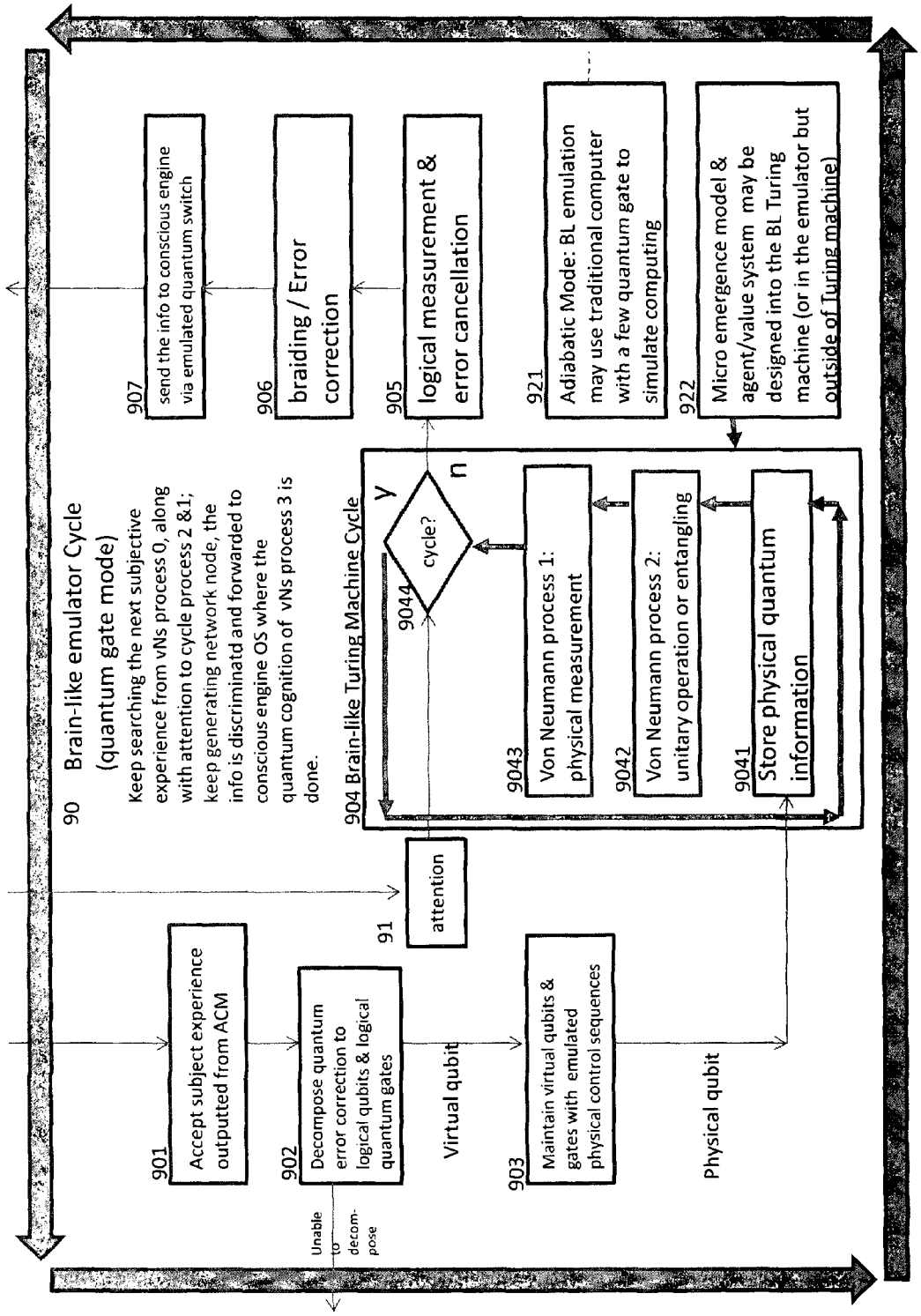
FIG. 9A is the system diagram of cyclic quantum gate model of BL emulator and BL Turing machine, emulating quantum computer device "quantum gate" to realize FIG. 8A, FIG. 8B and FIG. 8C.
Figure 9B:
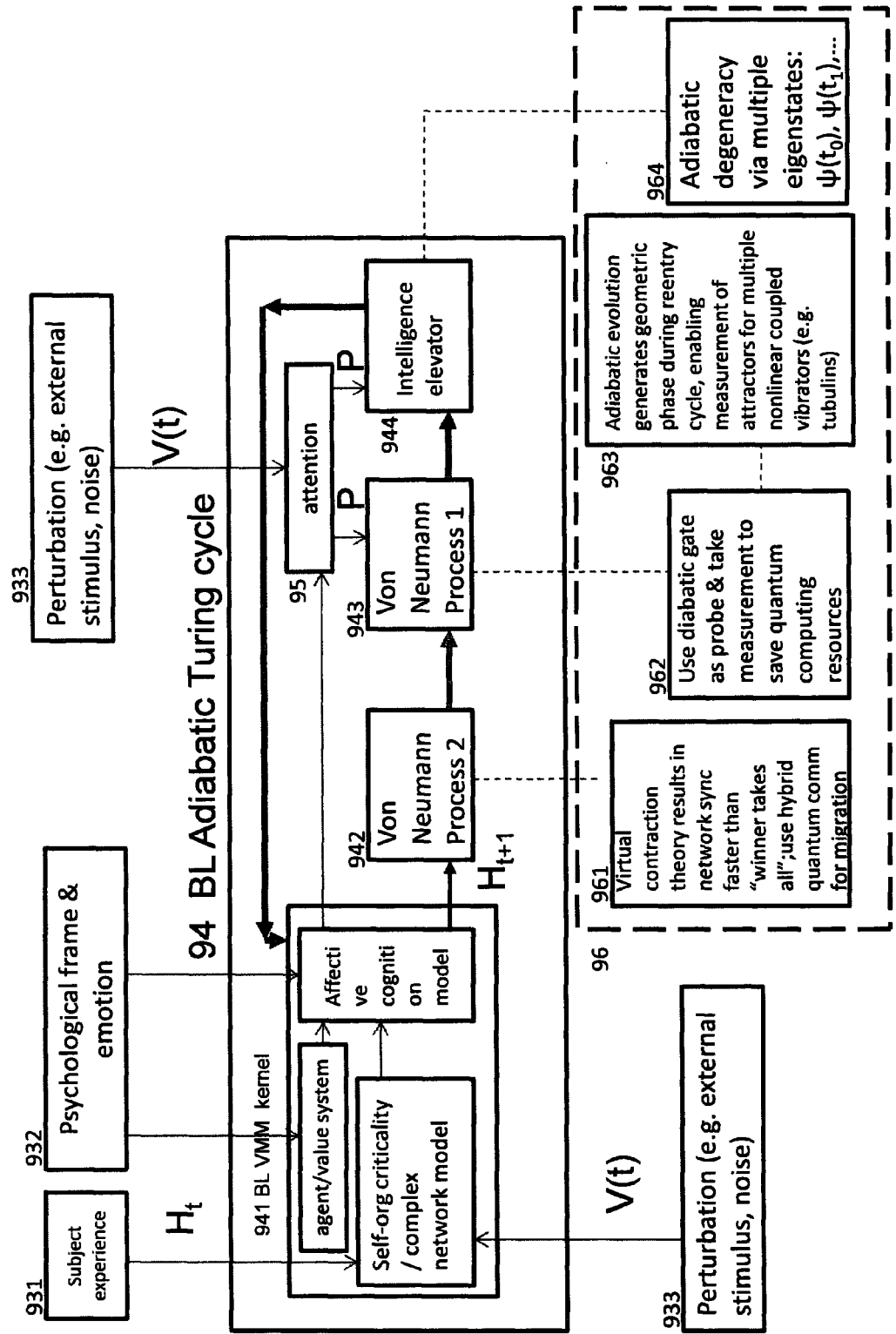
FIG. 9B is the system diagram of cyclic adiabatic quantum model of BL Turing machine, to realize box 921 and 922 of FIG. 9A.

FIG. 9B is the system diagram of cyclic adiabatic quantum model of BL Turing machine, to realize box 921 and 922 of FIG. 9A. FIG. 9B is a tight-coupled design, placing BL VMM kernel inside of BL Turing machine, such that the design principle DEGENERACY can be easily applied. The diagram does not show error correction method, which is different from the one for quantum gate model. Adiabatic error correction stresses maintaining ground state. The Hamilton at time t+1 of an adiabatic system is $$H(t+1)=H(t)+V(t)$$

Where V(t) is the perturbation function at time t. Solving Schrodinger equation, we obtain the eigenstate at time t $$|\Psi(t)>=\Sigma_n c_n(t)e^{-iEt/h}|n$$

Where Ψ(t) is the eigen function of time t. Eigen function is the result of solving a eigen value function. In Quantum Mechanics, it is the result of solving Schrodinger equation. This result is the left side of the above formulae, and is normally expressed in the special notation |Ψ(t)> in Quantum Mechanics to show its quantum eigen state;

Where $c_n(t)$ is the complex function of t, called amplitude.

The character "P" of FIG. 9B is the probability of the attention exerted on von Neumann process 1, meaning whether it is a "yes" or "no":

$$\Psi(t) \rightarrow \Psi(t+1) = P\Psi(t+1) + (1-P)\Psi(t)$$

The above formula means that if P is 1 (Yes), we get new Ψ(t+1); if P is 0 (No), we get old Ψ(t). Attention exerts influence not only on von Neumann process 1, but also on intelligence elevator with its decision power. P itself is again influenced by V(t). P is generated by ACM model, and is also a function of time.

Box 94 is adiabatic BL Turing cycle, comprises box 941 BL VMM kernel, box 942 von Neumann process 2, box 943 von Neumann process 1, box 944 intelligence elevator and box 95 attention. Adiabatic BL Turing cycle accepts three inputs: box 931 subject experience, box 932 psychological frame and emotion, and box 933 external perturbation. Notice that external perturbation impacts not only BL VMM kernel, but also attention.

Box 941 BL VMM kernel comprises self-organized criticality/complex network model, affective cognition model, and agent/value system. Self-organized criticality/complex network model accepts subjective experience and external perturbation as inputs; affective cognition model and agent/value system accepts psychological frame and emotion as inputs.

The thicker arrow lines show the BL Turing cycle from BL VMM kernel→von Neumann process 2, → von Neumann process 1, →intelligence elevator and eventually back to → BL VMM kernel.

Box 96 shows several features of a BL adiabatic quantum system:

THE IMPACT OF VIRTUALIZATION/VMM TO BCN: Box 961 states that in the von Neumann process 2, (1) virtual contraction theory encourages network synchrony which is faster than the neuronal "winner-takes-all (WTA)" (See Rutishauser et al., "Competition through Selective Inhibitory Synchrony", 2013.), showing the impact of virtualization to BCN. As a traditional AI computing principle, WTA may be used in machine learning theory, ie in human Cerebral cortex layer, WTA activates the neuron that impacts multiple inputs most to become output, and shuts up other neurons. However, the contract theory based on virtualization improves traditional WTA such that the activated neurons need not be in a single cortical layer. Neurons in two distant cortical layers can form a WTA BCE via quantum synchrony and entanglement. Moreover, the response time can be faster even though the distance is bigger. (2) During migration of BL OS (virtual machine) or even BL VMM itself, the already-entangled data are migrated by quantum teleporting. If the data involves traditional digital data, the box 3031 instruction to convert between digital and qubit data is used to convert first and then migrate, such that the migration of both digital or qubit virtual machines are accelerated using a hybrid quantum communication method that combines the above two ways of migration. (3) Adiabatic BL quantum system reuses resources: entangled quantum must be disentangled. Conscious engine generates new BCEs, like neuron neuro-genesis.

ADIABATIC QUANTUM MEASUREMENT: Box 962 states that during von Neumann process 1, the diabatic gate is used as probe to save quantum computing resource. Map the n qubits and k-body interactive target Hamiltonian to 2-body interaction. Use hybrid diabatic/adiabatic small amount of diabatic quantum gates to save quantum gate hardware resource, wherein the adiabatic register is the simulation register, and the diabatic quantum gate as probe register. Such optimization guarantees the parallel and network schedulers of BL VMM use minimum quantum gates and maximum traditional multicore resources.

ADIABATIC REENTRY CYCLE: Box 963 states that adiabatic evolution generates "geometric phase" during reentry cycles, such that attractors can be measured for multiple nonlinear coupled vibrator (e.g. tubulins).

ADIABATIC DEGENERACY: Box 964 states that in the intelligence elevator, adiabatic deengeracy uses multiple eigenstates: $\Psi(t_0), \Psi(t_1), \ldots$ to enhance system robustness and complexity.

SIMULATOR: BL emulator is a simulator when adiabatic quantum method is used, since no quantum algorithm can emulate quantum hardware with complete software.

TRANSFORMATION TO QUANTUM ALGORITHM: BL VMM must transform traditional artificial intelligence algorithms to quantum algorithms when running conscious quantum algorithms with no new quantum algorithm available.

BL Computing OS

Figure 10:
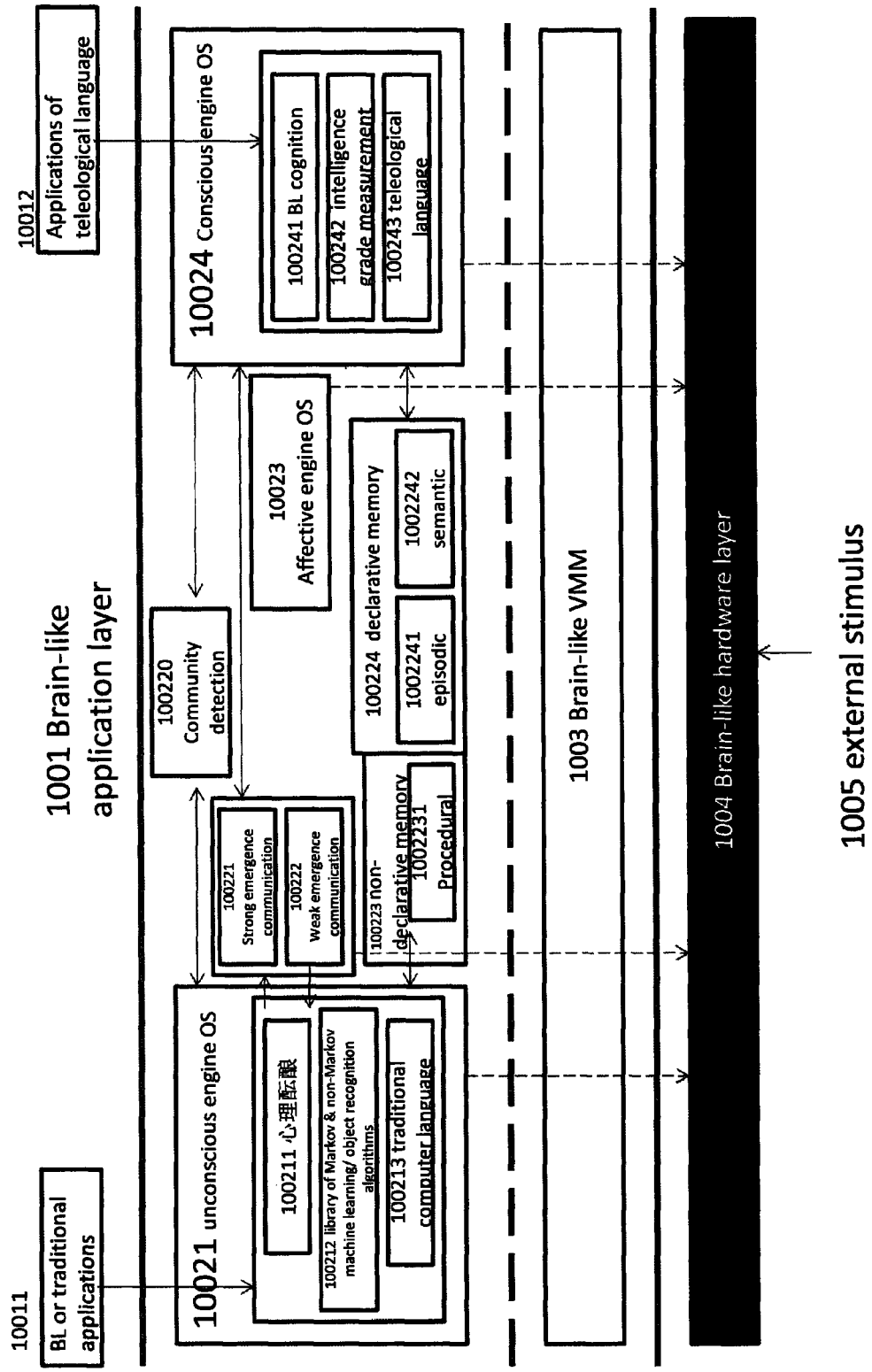
FIG. 10 is the architecture diagram of BL computing OSs, explaining the boxes 1021, 1022 and 1023 of FIG. 1.

FIG. 10 is the architecture diagram of BL computing OSs, explaining boxes 1021, 1022 and 1023 of FIG. 1. It illustrates the 1002 BL OS layer lies between 1001 BL application layer and 1003 BL VMM layer. At the bottom there is a 1004 hardware layer, which accepts external 1005 stimulus. There are three BL OSs: box 10021 unconscious engine OS, box 10024 conscious engine OS, and box 10023 affective engine OS. There are common OS components: box 100220 community detection model, box 100221 strong emergence communication, box 100222 weak emergence communication (for details of these emergence communication models see the explanation of FIG. 14A and FIG. 14B), box 100223 non-declarative memory, and box 100224 declarative memory (for details of these BL memory, see the explanation of FIG. 13).

The functions of unconscious engine OS comprise (1) 100211 psychological consolidation. This is a simple driver to push chaos concept into BL VMM cycle, resulting in some BCEs with higher intelligence grade under unconscious push. This is equivalent to human brain in dream or consolidation of knowledge over long period of time. Psychologists term this as psychological simulation, which is a cyclic activity activated by internal stimulus, not external stimulus. (2) 100212 Markovian and non-Markovian machine learning/object recognition method library. The library contains various traditional AI algorithms. (3) 100213 traditional computer languages.

Figure 11:
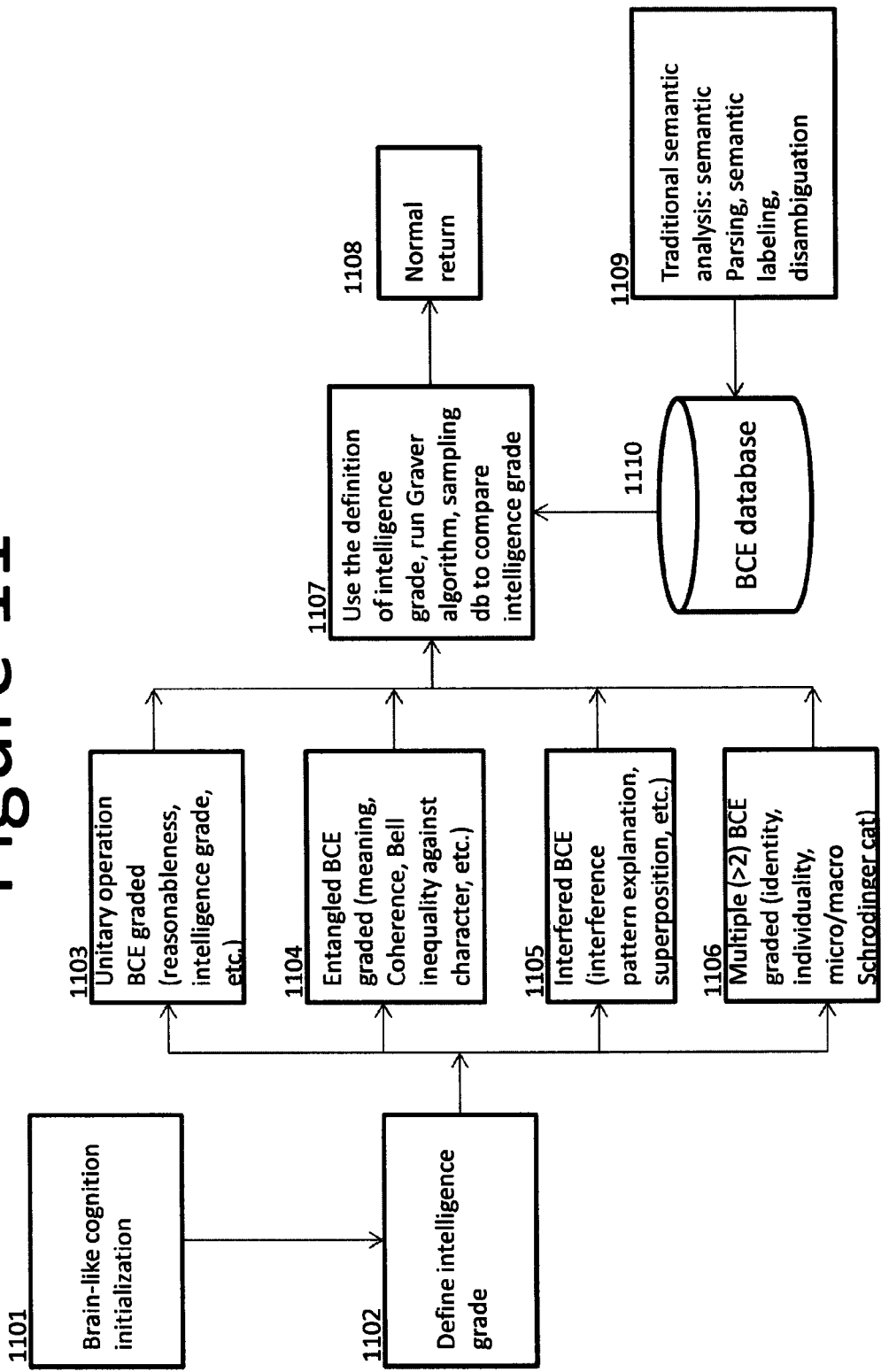
FIG. 11 is the flowchart of BL cognition, explaining the boxes 100241 and 100242 of FIG. 10.

Conscious engine OS comprises (1) 100241 BL cognition, see the explanation of FIG. 11 for details. (2) 100242 intelligence grade evaluation, see the explanation of FIG. 11 for details. (3) 100243 teleological language, see the explanation of FIG. 12 for details.

Box 10023 is affective engine OS, which provides psychological frame and emotion as inputs, and merges subject experience via BL VMM ACM model to generate attention. These two inputs also influence micro memory model.

BL Cognition

FIG. 11 is the flowchart of BL cognition, explaining the boxes 100241 and 100242 of FIG. 10. Here are steps:

Step 1101: initialization of BL cognition;

Step 1102: define intelligence grade. The definition is related to objective, and can be computed as follows: take the reward function of FIG. 6, multiply it with a distribution function, say 2 to the $-K(\mu)$, where $K(\mu)$ is Kolmogorov complex function and $\mu$ is probability distribution function. Sum up the product of the following cases. The sum is now the measurement of intelligence (see page 47 of Shane Legg 2008 PhD thesis, "Machine Super Intelligence"), and can be used for grade evaluation. The cases are: BCE is unitary operator, entangled two, or more than 2, hence to execute step 1103, 1104, 1105 and 1106 respectively;

Step 1103: Unitary operator BCE is graded for its reasonableness, intelligence grade, etc. Proceed to step 1107;

Step 1104: Entangled BCEs are graded for the combined meaning, coherence, Bell inequality against character, etc. Proceed to step 1107;

Step 1105: Interfered BCE is graded for interference pattern explanation, superposition, etc. Proceed to step 1107;

Step 1106: Multiple (>2) BCEs are graded for their identity, individuality, micro/macro Schrodinger cat. Proceed to step 1107;

Step 1107: Use the definition of intelligence grade, run Graver algorithm, sampling db to compare intelligence grade. Proceed to step 1108;

Step 1108: normal return;

Step 1109: Traditional semantic analysis: semantic Parsing, semantic labeling, and disambiguation. Proceed to step 1110 to execute BCE database operation;

Step 1110 is the BCE database, which provides data to execute step 1107.

Teleological Language

Figure 12:
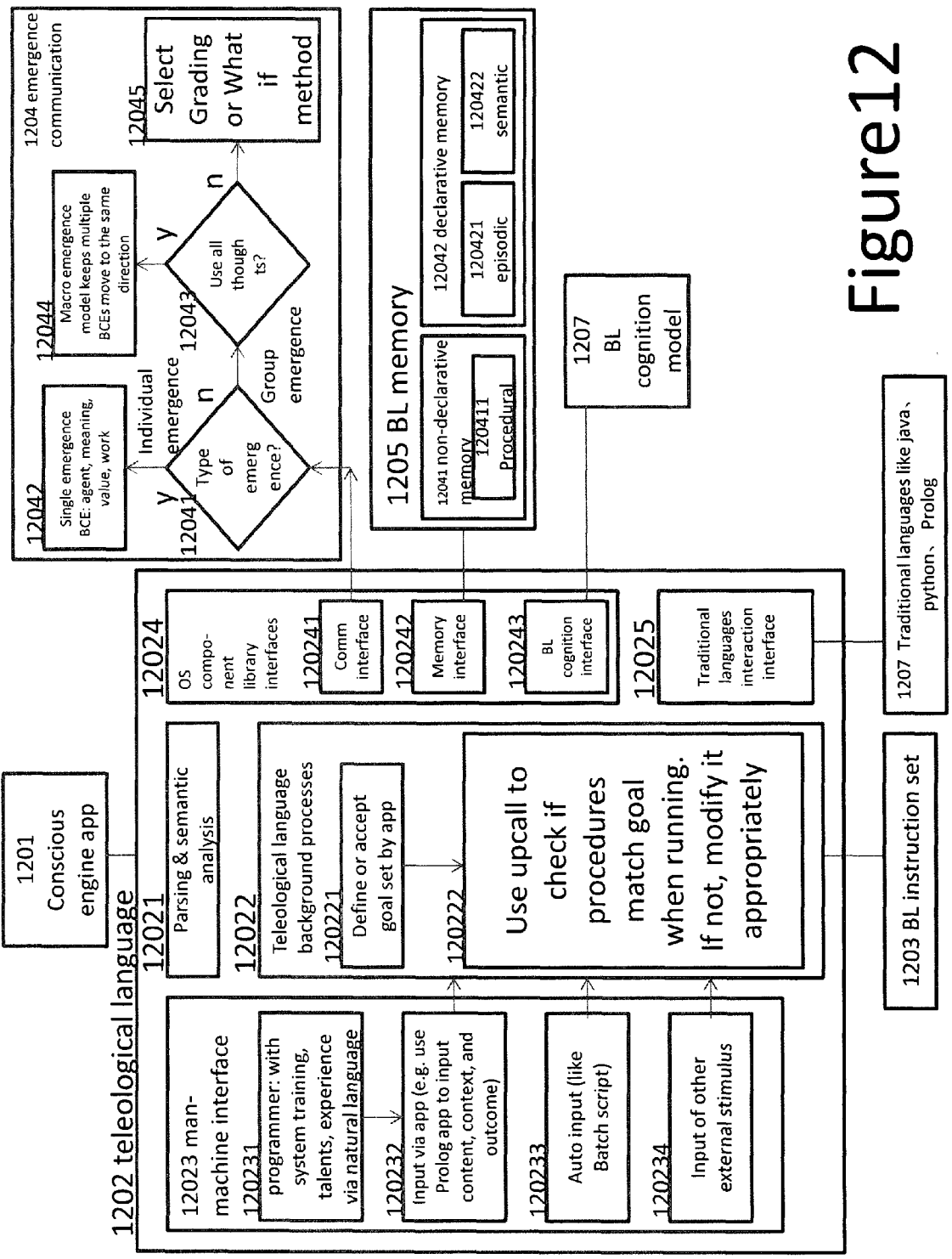
FIG. 12 is the flowchart of teleological language, explaining the box 100243 of FIG. 10.

FIG. 12 is the flowchart of teleological language, explaining the box 100243 of FIG. 10.

Box 1202 teleological language is the language for conscious engine, used to program the engine OS and 1201 conscious engine application. The teleological language itself can be written with teleological language, but the basic part is based on box 1203 BL instruction set.

Teleological language has 12021 parser and semantic analysis just as traditional language. The main computational body 12022 comprises the following logic steps: step 120221 defines by itself or accepts an objective set by application; step 120222 upward programming: use "upcall" to check if current operation matches objective. If not, adjustment must be made.

There are three interfaces for teleological language:

(1) Box 12023 man-machine interface, including 120231 programmer providing reinforced learning, talents, experience (say via natural language); 120232 application input (say with Prolog program to input content, context and outcome); 120233 automatic input (say with batch script); 120234 other external stimulus;

(2) Box 12024 OS component library interfaces: to provide 120241 interfaces to emergence communication, 120242 interface to BL memory (communicate with 1205 BL memory, including 12041 non-declarative memory and 12042 declarative memory), and interface to BL cognition model. Thus, conscious engine applications communicates with OS components via the said interfaces;

(3) Box 12025 traditional language interactive interfaces (IIf): the BL system uses IIf to communicate with 1207 traditional language. There are three IIf formats: (a) use Aspect Programming to insert upward programming instructions and expand traditional language such as Prolog, Python or Java; (b) teleological-language program and traditional-language program as two separate programs to interact via IIf; (c) teleological language and traditional language combine to form a new language including one language as an in-inline insertion to another language.

Box 120241 communication interface communicates with 1204 emergence communication module. Emergence communication module comprises the following steps:

Step 12041: determine if individual emergence or group emergence. If individual emergence, proceed to step 12042. Otherwise it is group emergence, proceed to step 12043;

Step 12042: macro emergence model maintains single emergence concept, signifying agency, meaning, value and work;

Step 12043: determine if all concepts are useful. If yes, proceed to step 12044. Otherwise, proceed to step 12045;

Step 12044: macro emergence model maintains multiple BCEs moving to the same direction;

Step 12045: select one of the following: grading algorithm or what-if algorithm.

Figure 14B:
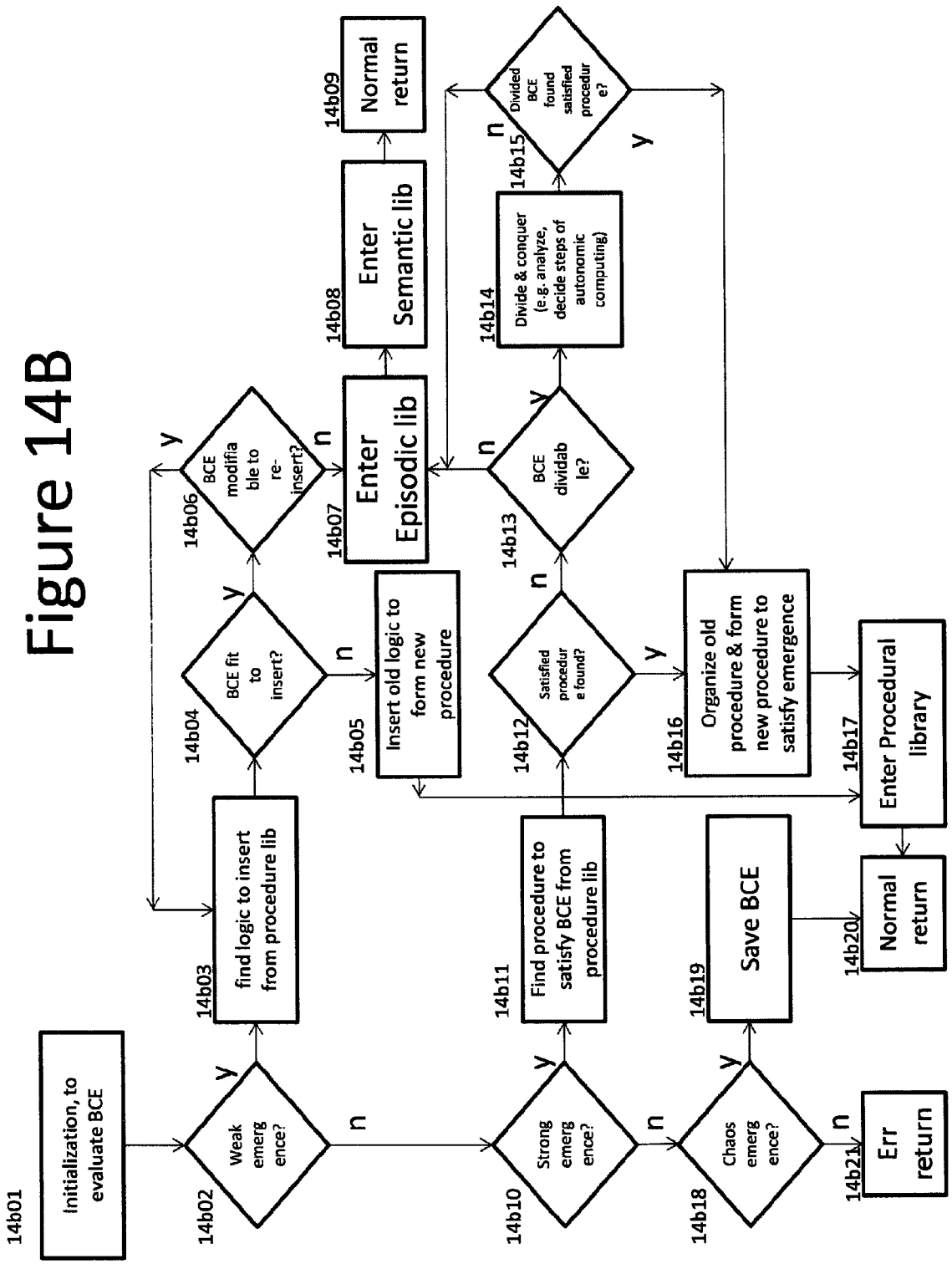
FIG. 14B is the flowchart of the macro emergence model of BL OS, explaining, with flowchart, the boxes 100221 & 100222 of FIG. 10, as well as the step 218 of FIG. 2.

For details of macro emergence model, see the explanation of FIG. 14A and FIG. 14B.

BL Memory

FIG. 13 is the flowchart of BL memory, explaining the boxes 200223 and 100224 of FIG. 10, and the box 308 of FIG. 3. Here we borrow the ideas of human brain memory classification: semantic memory, episodic memory and procedural memory. Notice in BL VMM the memory operation, regardless read or write, is completed via multiple processes. Multiple processes resort to the design principle of degeneration, which may also realize the memory mechanism association.

Step 1301: start memory read and write. Proceed to step 1302;

Step 1302: determine memory type. If type is 1303 semantic, proceed to step 1304. If type is 1305 episodic, proceed to step 1306. If type is 1307 procedural, proceed to step 1308; if type is 1309 associated memory, proceed to step 1308. Otherwise, proceed to step 1311;

Step 1304: use frame, block, network, schema model to operate. Proceed to step 1319;

Step 1306: use Prolog program to perform symbolic read and write. Proceed to 1319;

Step 1308: use unconscious engine to read and write. Proceed to step 1319;

Step 1310: use quantum theory and neural net to read and write. Proceed to step 1319;

Step 1311: error return;

Step 1312: determine if read/write BCE state. If yes, proceed to step 1313. Otherwise, proceed to step 1322;

Step 1313: determine if the information saved to VBSM. If yes, proceed to step 1314. Otherwise, proceed to step 1315;

Step 1314: Use quantum theory to calculate probability. Proceed to step 1319;

Step 1315: determine if simulating BCE concept stream. If yes, proceed to step 1316. Otherwise, proceed to step 1317;

Step 1316: use quantum coherence to lead the result of quantum coherence. Proceed to step 1319.

Step 1317: determine if simulating a train of BCEs. If yes, proceed to step 1318. Otherwise, proceed to step 1311;

Step 1318: use diffused quantum coherence state to lead to a train of mind state. Proceed to step 1319;

The following steps are executed in BL VMM, separated with a dash line from the above steps executed in the OS.

Step 1319: enter micro memory model. Proceed to step 1320;

Step 1320: accept the influence from psychological frame, emotion and value system, and complete (1) write: categorize information and create multiple processes to handle the information; (2) read: multiple process using degeneration to reappear information. Proceed to step 1321;

Step 1321: normal return;

Step 1322: error return.

BL OS Macro Emergence Model

FIG. 14A is the architecture diagram of the macro emergence model of BL OS, explaining the boxes 100221 & 100222 of FIG. 10.

Similar to traditional computer OS, BL engine OS also manages communication resources. Macro emergence model exchanges communication between unconscious engine OS and conscious engine OS, similar to human brain's inter-hemispheric communication. However, if we consider a project coordinated in a multi-person community, the communication can be extended to multiple brains, or multiple sets of OSs running on BL VMM, with each set containing conscious, unconscious and affective engine OSs. There may be people specialized in right brain, forming the strong emergence concept, such as the vision for a company. Or people specialized in left brain forms weak emergence concept, such as contribution to company workflow or part of the flow.

As for the content of communication, it can be individual BCE or routine composed by multiple BCEs. According to the definition for intelligence grade illustrated in step 1102 of FIG. 11, BCE can be categorized as strong emergence (high intelligence grade), weak emergence (low intelligence grade), and chaos emergence (extremely weak intelligence grade). For situation of weak emergence, the BL system finds a routine to be inserted with the weak emergence BCE; for situation of strong emergence, the BL system finds several routines jointly to satisfy the strong emergence BCE.

Box 14a1 at the left of FIG. 14A is such a routine found by BL system which can be inserted with weak emergence BCE 14a41, 14a42, and 14a43; box 14a3 at the right of FIG. 14A is a group of routines found by the BL system, comprising many routines 14a31, 14a32, . . . , to be used to satisfy strong emergence BCE 14a51. Weak emergence BCE and strong emergence BCE both come from episodic library 14a22. The said routine or group of routines is from procedural library 14a23. A routine may be modified and replaced back to procedural library.

FIG. 14B is the flowchart of the macro emergence model of BL OS, explaining, with flowchart, the boxes 100221 & 100222 of FIG. 10, as well as the step 218 of FIG. 2. The steps are:

Step 14b01: initialized to evaluate emergence concept. Proceed to step 14b02;

Step 14b02: determine if BCE is weak emergence. If yes proceed to step 14b03. Otherwise, proceed to step 14b10;

Step 14b03: from procedural library find routines that can be inserted with weak emergence concept. Proceed to step 14b04;

Step 14b04: determine if the weak emergence concept is suitable to insert. If yes, proceed to step 14b05. Otherwise, proceed to step 14b06;

Step 14b05: insert the old weak emergence concept to form new routine. Proceed to step 14b18;

Step 14b06: determine if a modified concept can be re-inserted. If yes, go back to step 14b03. Otherwise, proceed to step 14b07;

Step 14b07: Enter episodic library. Proceed to step 14b08;

Step 14b08: Enter semantic library. Proceed to step 14b09;

Step 14b09: normal return;

Step 14b10: determine if BCE is strong emergence. If yes, proceed to step 14b11. Otherwise, proceed to step 14b18;

Step 14b11: from procedural library find routines that satisfy strong emergence concept. Proceed to step 14b12;

Step 14b12: determine if the routine found is satisfactory. If yes, proceed to step 14b13. Otherwise, proceed to step 14b17;

Step 14b13: determine if emergence concept can be divided. If yes, proceed to step 14b14. Otherwise, proceed to step 14b07;

Step 14b14: perform divide and conquer (e.g. autonomic process such as analyzing, decision making, etc.). Proceed to step 14b15;

Step 14b15: Determine if the divided emergence concept can find satisfactory routine. If yes, proceed to step 14b17. Otherwise, proceed to step 14b07;

Step 14b16: organize old routine to form new routine in order to satisfy emergence concept. Proceed to step 14b17;

Step 14b17: enter procedural library. Proceed to step 14b20;

Step 14b18: determine if BCE is chaos emergence. If yes, proceed to step 14b19. Otherwise, proceed to step 14b21;

Step 14b19: store BCE. Proceed to step 14b20;

Step 14b20: normal return;

Step 14b21: error return.

BL Autonomic Computing System

Figure 15A:
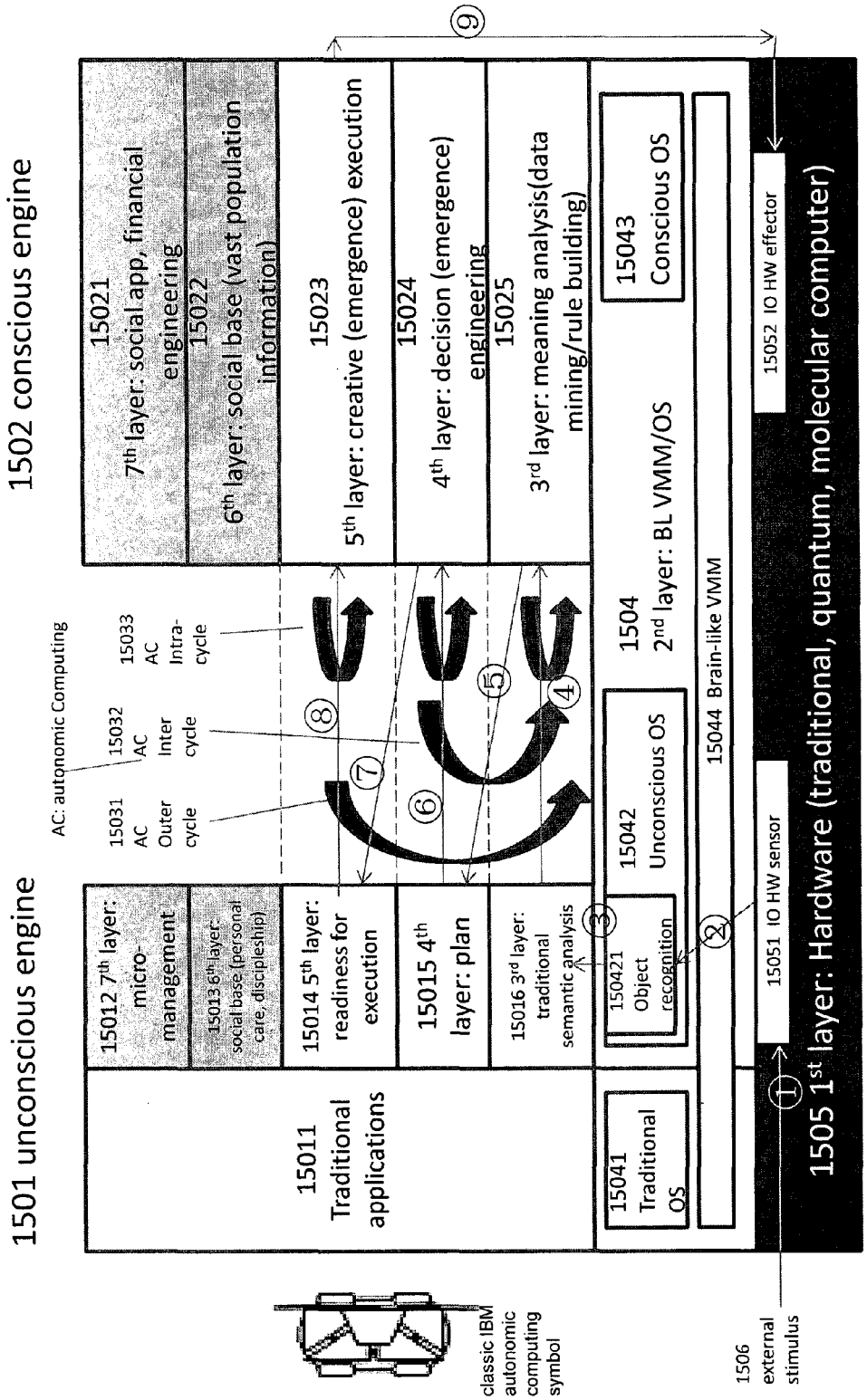
FIG. 15A is the architecture diagram of BL autonomic computing system.

FIG. 15A is the architecture diagram of BL autonomic computing system. The diagram further divides the BL computing virtualization method into 7 layers from bottom to top, wherein conscious engine and unconscious engine each has its own 7 layers. The diagram shows if the 7 layers of unconscious engine are taken as the main processes, each of the 7 layers of conscious engine are auxiliary to the corresponding unconscious layer via autonomic outer-cycle, inter-cycle and intra-cycle;

Differing from traditional autonomic computing, BL autonomic computing system inserts emergence concepts from conscious engine via outer-cycle, inter-cycle, and intra-cycle, into the traditional autonomic monitor→analyze→plan→execute or MAPE process. Obviously if the 4 MAPE processes of unconscious engine are routinely realized, the project management would be very rigid and be the cause of project delay or even failure. With emergence concept insertion, the success rate is increased greatly.

Box 1501 is unconscious engine. The applications of unconscious engine comprises box 15011 traditional applications, box 15012 unconscious engine's $7^{th}$ layer application: micro management, box 15013 unconscious engine's $6^{th}$ layer application: social foundation (personal care, discipleship, leadership), box 15014 unconscious engine's $5^{th}$ layer application: execution preparation, box 15015 unconscious engine's $4^{th}$ layer application: planning, and box 15016 unconscious engine's $3^{rd}$ layer application: parsing and semantic analysis.

Box 1502 is conscious engine. The applications of conscious engine comprises box 15021 conscious engine's $7^{th}$ layer application: social application and financial engineering, box 15022 conscious engine's $6^{th}$ layer application: social foundation of large population information, box 15023 conscious engine's $5^{th}$ layer application: creative execution, box 15024 conscious engine's $4^{th}$ layer application: decision engineering, and box 15025 conscious engine's $3^{rd}$ layer application: meaning analysis/data mining/rule building.

The arc arrow 15031 is the outer-cycle of BL autonomic computing system, meaning after monitor→analyze→plan→execute, the cycle goes back to monitor. The arc arrow 15032 is the inter-cycle of the BL system, meaning any two processes may mutually cycle. The arc arrow 15033 is the intra-cycle, meaning any single process can repeat itself. For instance, unconscious engine's parsing analysis-→conscious engine's data mining→(returns to) unconscious engine's parsing analysis.

Box 1504 is the $2^{nd}$ layer BL OS/VMM, comprises box 15041 traditional OS, box 15042 unconscious engine OS (including box 150421 object recognition), box 15043 conscious engine OS, and box 15044, the focusing point of the disclosed invention: BL VMM.

Box 1505 is the $1^{st}$ layer: hardware (traditional, quantum, molecular computer), comprises box 15051 I/O hardware sensor, and box 15052 I/O hardware effector. The hardware layer accepts 1506 external stimulus.

The steps of BL autonomic computing system comprise:
Input Function:
Arrow line ①: External stimulus enter hardware sensor, comprise text, graphics, audio and video data;
Monitoring Function:
Arrow line ②: The primitive stimulus data enter object recognizer of unconscious engine;

Analysis Function:
Arrow line ③: The results of object recognition such as square, circle and/or other geometric shapes are sent to traditional semantic analysis;
Arrow line ④: Traditional parsing analysis must rely on the BL cognition of conscious engine OS to get real meaning, and the application of the $3^{rd}$ layer of conscious engine may replace manual efforts to create rules and perform data mining to understand the real meaning of external stimulus;
Arrow line ⑤: The fully-understood semantic meaning is sent to the $4^{th}$ layer application of unconscious engine for planning;
Planning Function:
Arrow line ⑥: Traditional planning can be merely routine work without any emergent idea needed by decision making. An example would be a manager who understands planning process but has no domain knowledge, hence cannot assign appropriate domain-knowledgeable subordinates in the plan. The domain knowledge is subject experience, which must be assisted by the $4^{th}$ layer application of conscious engine to gain the emergent concept of decision process;
Arrow line ⑦: A professional, knowledgeable, innovative plan is sent to the $5^{th}$ layer application of unconscious engine to prepare for execution;
Execution Function:
Arrow line ⑧: Routine execution preparation may handle the project OK, but without creative execution, the project management may be ineffective. For instance, an unexpected difficulty is encountered and the manager must form ad hoc team for special care and resolving problem. Therefore, the routine execution preparation must be assisted by the $5^{th}$ layer application of conscious engine to execute creatively and avoid ineffectiveness;
Output Function:
Arrow line ⑨: A complete execution realized at the hardware effector.

Figure 15B:
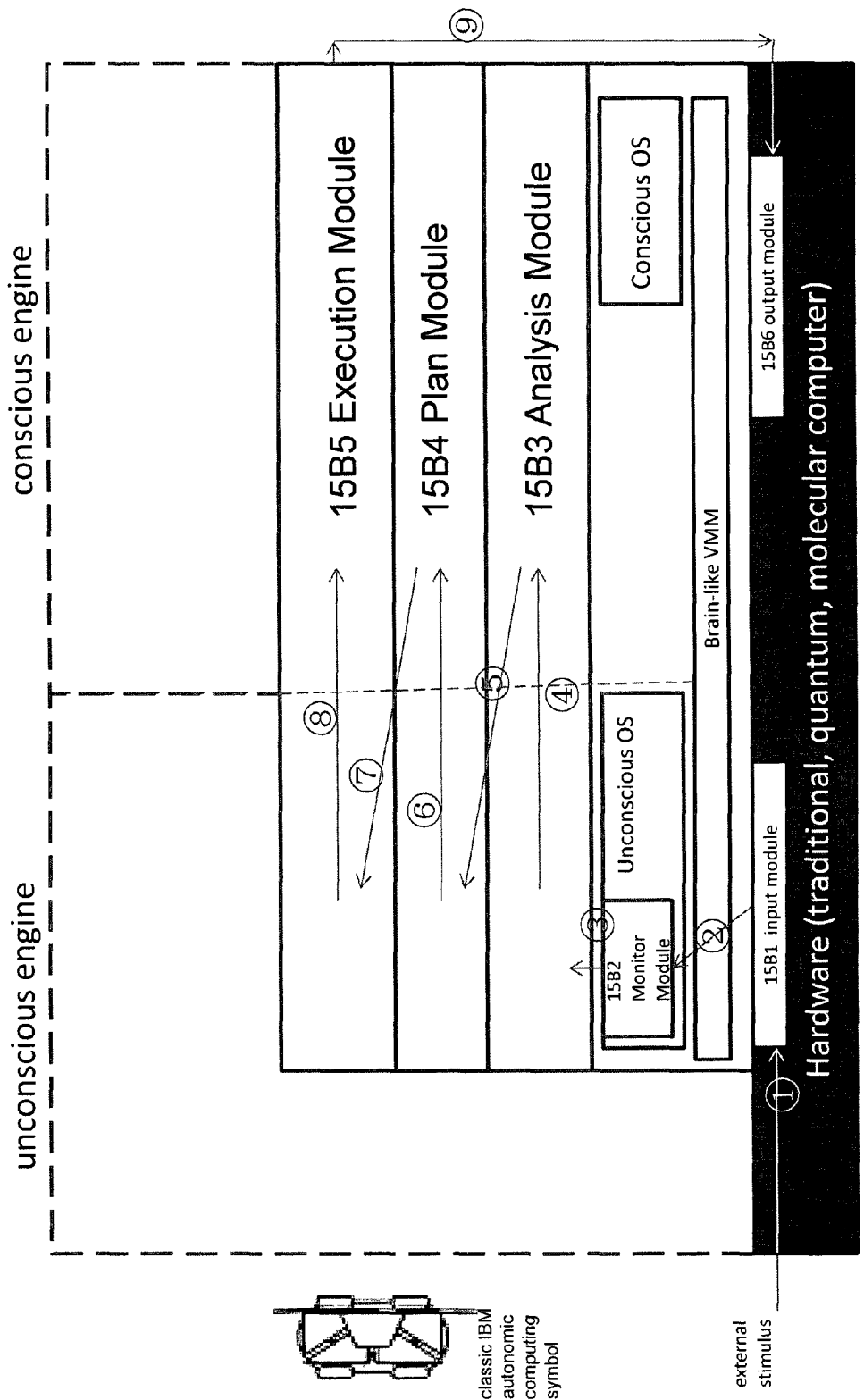
FIG. 15B shows the 6 functional modules of FIG. 15A.

The six functions stated above are illustrated in FIG. 15B as functional modules. Box 15B1 is input module, box 15B2 is monitor module, box 15B3 is analysis module, box 15B4 is planning module, box 15B5 is execution module, and box 15B6 is output module. The meaning of arrow line ① to ⑨ is the same as that of FIG. 15A. These modules extend the functions of traditional autonomic computing, and the technical effects are solutions that can be more agile and creative.

Performance Service System of Multi-Core Computing Cluster

Figure 16:
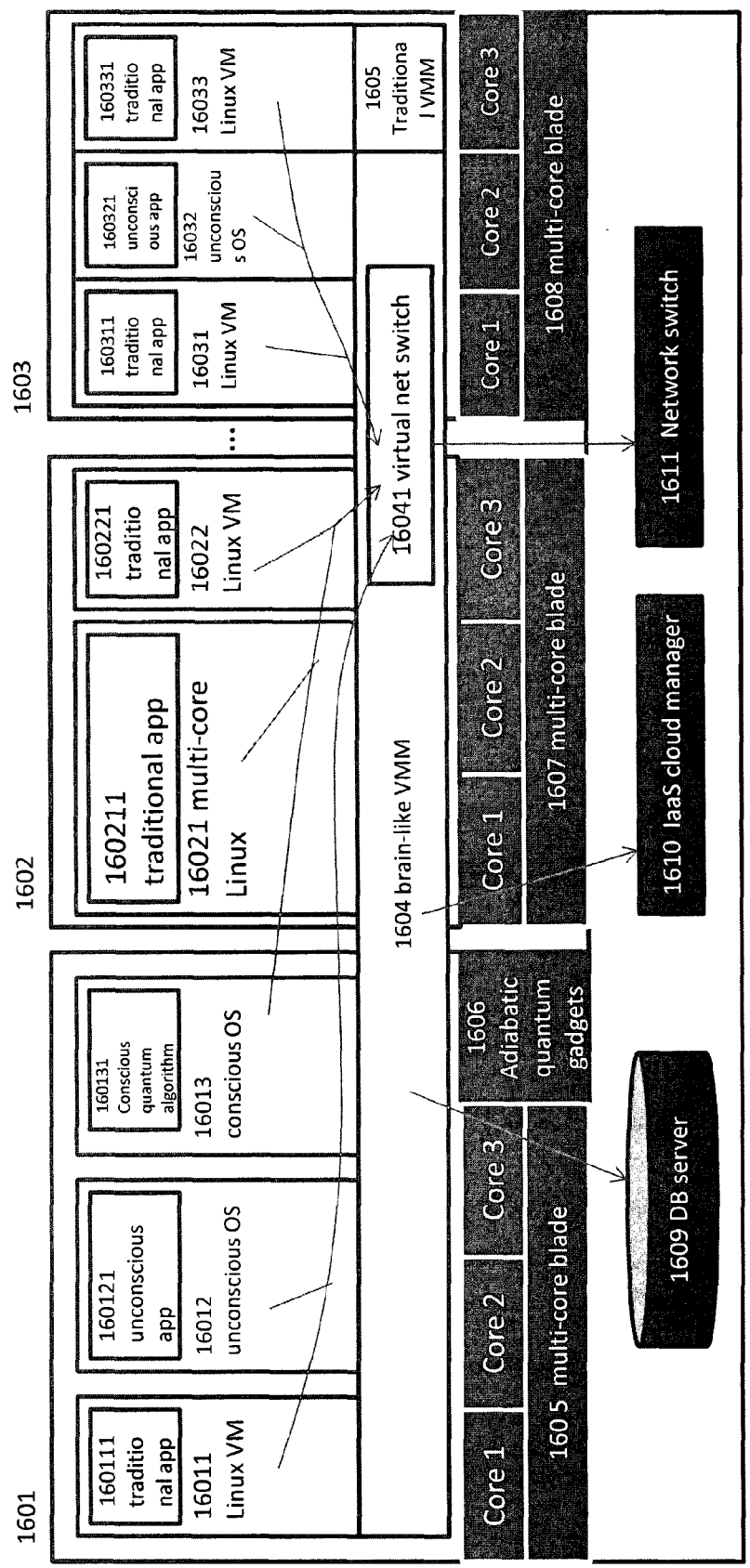
FIG. 16 is the architecture diagram of performance service system for multi-core computer cluster.

FIG. 16 is the architecture diagram of performance service system for multi-core computer cluster.

When quantum computer is commercialized initially, the traditional computers are still proliferated. One of the quantum computing tasks is to assist traditional computer to advance its return of investment. One inevitable mission will be to enhance the performance of multi-core computer with BL computing virtualization.

An advantage to use BL computing virtualization for performance service of the multi-core computer cluster is: BL VMM can be installed on every blade servers and can communicate with performance information amongst them. The macro emergence model of FIGS. 14A and 14B has capabilities to inter-communicate amongst BL VMMs of different servers. From FIG. 15A, the BL autonomic computing architecture supports 15041 traditional OS; and basically the autonomic computing reference architecture (ACRA) is still valid in the BL situation, hence BL VMM is completely compatible with traditional OS and ACRA architecture. This means no code change of traditional application and traditional OS. Moreover, Performance Monitoring Unit (PMU) is a piece of hardware collecting performance statistics information on general CPU (x86, ARM, SPARC, MIPS), comprising several control registers and data registers. Because PMU is able to report the health of the low-level traditional hardware, and capture performance information for BL VMM, the emergence idea of BL computing may improve performance situation creatively anytime when the existing performance method is regarded as subjective experience.

Box 1601 is the software running on multi-core blade server 1605, and adiabatic quantum gadgets 1606, comprises BL VMM 1604 and three OS software: traditional Linux virtual machine (VM) 16011 (with traditional application 160111 running on it), unconscious engine OS 16012 (with unconscious engine application 160121 running on it), and conscious engine OS 16013 (with conscious engine application 16013 running on it). The server has complete set of BL computing components, and is the master server of the entire multi-core computer cluster.

Box 1602 is the software running on multi-core blade server 1607, comprising BL VMM 1604 and two OS software: multi-core Linux 16021 (with traditional application 160211 running on it), and traditional Linux virtual machine 16022 (with traditional application 160221 running on it). The server runs BL VMM without BL engine. Therefore, the server may run traditional multi-core performance tool, but it cannot collect performance information in BL engine format ("BL information" hereafter) for the master server.

Box 1603 is the software running on multi-core blade server 1608, comprising BL VMM 1604 and two OS software: the unconscious engine OS 16032 (with unconscious engine application 160321 running on it), and 2 traditional Linux virtual machines 16031 (with traditional application 160311 running on it), and 16033 (with traditional application 160311 running on it). The server runs BL VMM and unconscious engine, and is able to collect BL information for the master server.

Box 1604 BL VMM communicates with VMs of other servers via virtual network switch 16041. The switch eventually must utilize physical network switch 1611 for physical connection. BL VMM also connects to IaaS cloud manager 1610. Respective blade server places the collected BL information in database 1609. BL VMM reads the BL information from the database, and takes it as subjective experience to improve the performance of the entire cluster.

Figure 17:
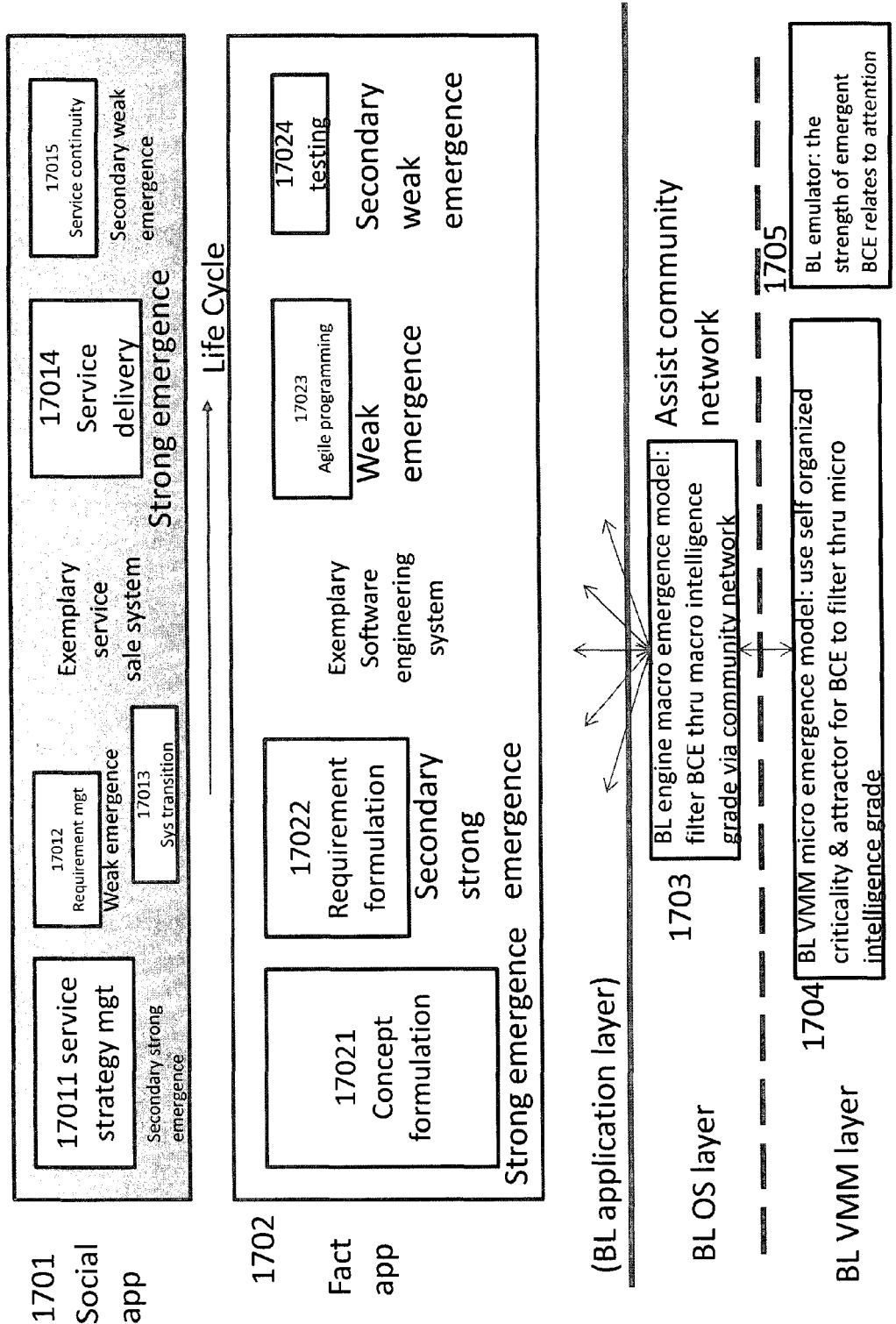
FIG. 17 is the architecture diagram of emergent software development and service delivery systems for information industry.

Emergent Software Development and Service Delivery Systems for Information Industry FIG. 17 is the architecture diagram of emergent software development and service delivery systems for information industry.

There exist several standards to operate the management flow for companies in information industry, e.g. CMMI-DEV/SVC(Capability Maturity Model Integration for Development & Service), IPD(Integrated Product Development), etc. These standards can be automated by the disclosed invention. In addition to the resulted flow knowledge itself (flow templates, best practices, and wealth library), the most important knowledge stored in the emergent BCN comprises: development knowledge of software engineering processes, as well as software service delivery processes. Development knowledge again comprises various engineering documents: concept document, design document, code and test document. The documents are created with emergence BCN. For service delivery flow, strong emergence is in the service strategic management and service deliver flows. For software engineering flow, the intelligence grade of emergence BCE ranges from strong-emergence concept document to weak-emergence test document. Details are illustrated as follows:

Service Delivery Flow:

Box 17011 Service Strategy Management Stage

In this stage the service manager endeavors to figure out various service strategies, such as reaching automated service via website. For sales service, strategies comprise sales pitch, people networking, and quality of on-site service. These need emergent ideas of high grade of intelligence.

Box 17012 Requirements Management Stage

Since requirements have been written by engineering process, there is a need for modification. Therefore, the intelligence grade of modifying requirements content is not high. This is a weak emergence.

Box 17013 Service Transition Stage

System transition means the software developed at the developer site is now transitioned to run on customer site. Normally a committed customer will make transition easier, since only technical problem needs to be resolved. However, the first purchase order (first customer in a market sector) requires more considerations, such as hard-to-find "guinea pig", the exposed software defects on-site, customer complaints, the welfare of the developer, etc. However the content in this is weak emergence.

Box 17014 Service Delivery Stage

This is the most important stage in the whole service delivery flow, with complex situations of quality assurance related to contract. For sales service, eventually it is the contract signing, including internal and external public relations, hence the strong emergence in interpersonal relation.

Box 17015 Service Continuity Stage

The stage is about technical support and post-sale service, requires relatively small innovation, hence secondary weak emergence.

Software Engineering Flow:

Box 17021 Concept Formulation Stage

Concept formulation is like writing a PhD thesis, a paper or a book. The first thing is to collect information, either search the emergence idea of others during literature review, or write down our own emergence idea on cards. Then organize the information by putting together our own or others into a reasonable concept. Such traditional organization method can be added with BL computing virtualization method so that no emergence idea is missed. This is particularly true in enterprises where the concept document is considered as strong emergence, and must combine two emergence BCNs of market situation and technical trend, both changing rapidly.

Box 17022 Requirement & Prototyping Stage

Prototyping is normally weak emergence. A prototype is logic code inviting comments from others (weak emergence) when done. Or, it is continuously modified by inserting the writer's own idea, as unconscious chaos concepts are consolidated and becomes conscious. It is not strong emergence, but when a lot of engineering prototypes are accumulated into a library, similar to the procedural memory in the human brain, the logical and reasonable combination of some prototypes may be used by strong emergence ideas.

Prototyping is part of requirements stage: writing requirements document while prototyping. While the process is weak emergence, it is a stage where innovation or emergence ideas can be inserted to much larger extent than those in the agile programming stage.

Box 17023 Agile Programming Stage

Agile programming is different from Prototyping in that prototyping is normally single-brain behavior, but agile development is a group behavior (multiple brains) where management and coordination are important. Regarding Software Complexity, it may be analyzed by complex network theory. For instance, the inheritance of java language can create hierarchical network in vertical direction. Class is node, and inheritance is arc. In addition, the call between java methods is arc in horizontal direction. This complex network may also have self-organized criticality. The BL computing virtualization method is used to evaluate software itself as a BCN which is chaos, ordered weak emergence, or critical strong emergence.

Box 17024 Testing Stage

During testing, emergence insertion is low, including intelligent ways to do beta tests (customer on-site verification) for small modification/insertion of ideas to match customer requirements.

Box 1703 is BL OS layer, wherein the macro emergence model of BL engine filters BCEs with their intelligence grade. Any of the aforementioned services or development flow processes, if automated as a BL application, may interact with macro emergence model of this layer.

Box 1704 is BL VMM layer, wherein the micro emergence model filters BCE with their intelligence grade via BCE state, such as local or global criticality. Box 1705 is BL emulator where the strong or weak emergence is emphasized by attention or will power. This is like a responsible chief engineer realizes how important his attention must be emphasized at the concept formulation stage, or the service delivery manager realizes to place his/her attention at the service strategy management stage and service delivery stage.

Mission Critical Business Continuity/Disaster Recovery System

Figure 18A:
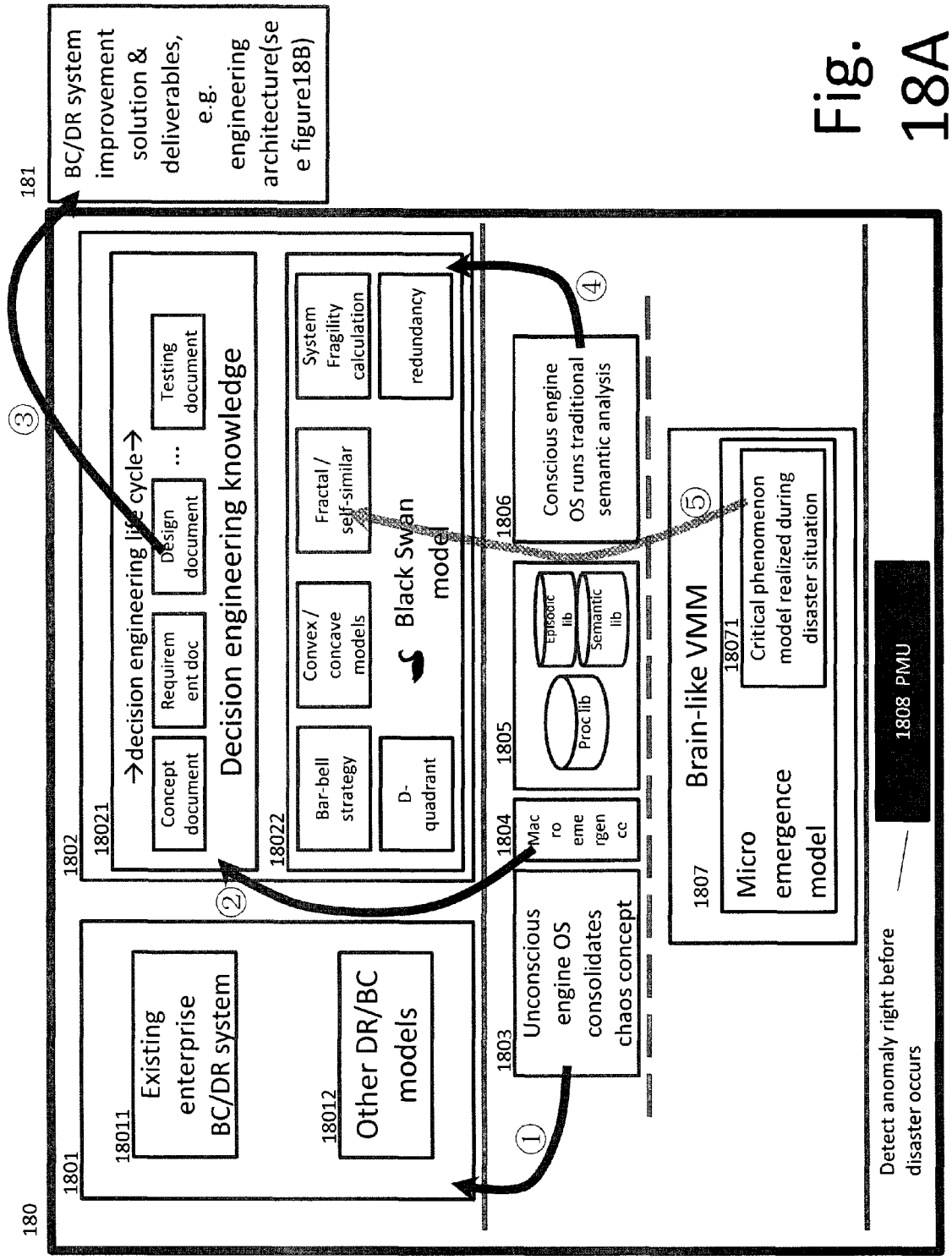
FIG. 18A is the architecture diagram if mission-critical disaster recovery system.

FIG. 18A is the architecture diagram of mission-critical business continuity and disaster recovery (BC/DR) system. An example is the mission-critical banking system, where a small system error could cause a billion-dollar loss if not recovered in short notice; or the military information system where a wrong message could cause hundreds of soldier's lives.

Box 1801 is unconscious engine application, wherein box 18011 is the existing BC/DR in the problem company. After the installation of BL computing virtualization product, the product still takes advantage of the value of the existing system as it has accumulated past experiences to adapt to various old enterprise problems. Box 18012 is BC/DR systems of other companies, where the subjective experience/knowledge of them can be absorbed. The two applications can be traditional non-AI application, or AI algorithm, but they don't have the nature of BL computing innovation.

Box 1802 is conscious engine application, wherein box 18021 is decision engineering model. The model extends traditional decision analysis to engineering flow, and matches software engineering flow of FIG. 17, where the emergence ideas for BC/DR are transformed into software, with various weak or strong emergence situations for the flow stages. Emphasis and attention are then applied to control the success of the project. Decision engineering life cycle includes the writing of concept document, requirements document, design document and test document. Box 18022 black swan theory model comprises bar-bell strategy, convex and concave model, self-similar model, redundancy, fragility computation, and the $4^{th}$ quadrant (consistent with box 1015 D-quadrant) of black swan theory. Details of black swan theory are in N. N. Taleb 2010 book "The Black Swan: the impact of the highly improbable"

BL OS layer comprises box 1803 unconscious engine OS (running chaos concept consolidation), box 1804 macro emergence model, box 1805 BL memory (including episodic library, semantic library and procedural library), box 1806 conscious engine OS (running BL cognition model and traditional semantic analysis).

BL VMM layer in this diagram shows two important components: box 1807 micro emergence model and its mathematical model for BC/DR: box 18071 critical phenomenon model. In addition, box 18072 is the migration mechanism of BL VMM. During peace time or disaster time, BL OS migrates via quantum communication, and BL VMM via the hybrid quantum communication method described in box 961 of FIG. 9B.

Several critical flows (not in sequential order) are illustrated below:

Flow ①, unconscious engine BL-computing virtualizes existing and other company BC/DR methods, analyzes their important ideas, saves them in the BL memory, and formulates BL emergence BCN. The ideas start consolidating.

Flow ②, when implementing decision engineering, activate macro emergence model, and manage the documenting flow of concept formulation to testing according to the intelligence grade of strong emergence, secondary emergence, weak emergence, and secondary weak emergence.

Flow ③, box 181 is a design document as one of the deliverables of BC/DR improvement project, the engineering architecture diagram. See FIG. 18B for details.

Flow ④, conscious engine runs traditional semantic analysis, and inputs the various black swan models and knowledge of decision engineering into BCN, by employing BL cognition method.

Flow ⑤, black swan self-similar model, modeled with mathematical interface instruction (see explanation (h) of box 3031 BL instruction set) regarding critical phenomena for BC/DR application.

Sample Design Architecture Diagram of Mission-Critical BC/DR

Figure 18B:
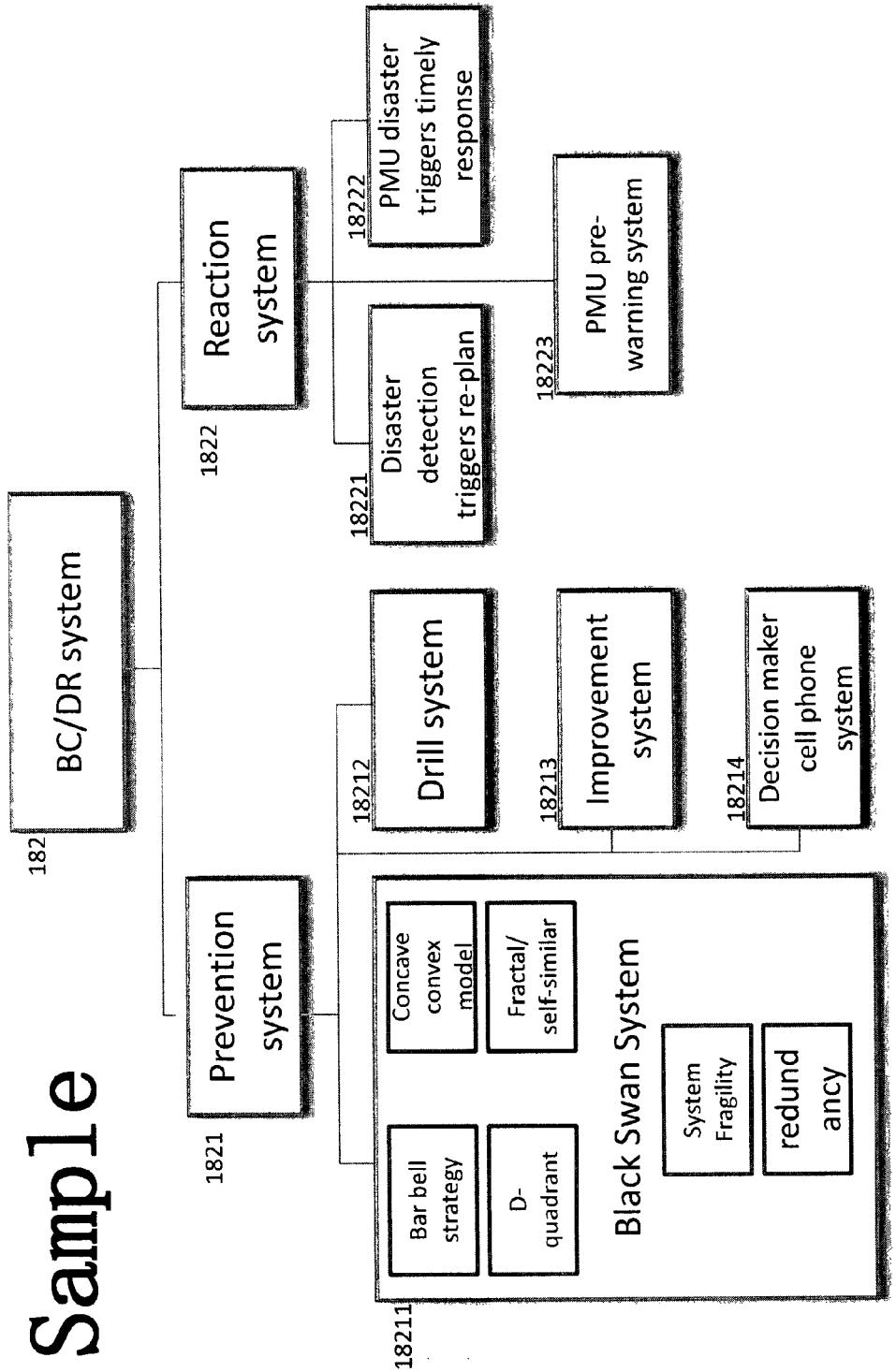
FIG. 18B is a sample design architecture diagram of mission-critical disaster recovery.

FIG. 18B is a sample design architecture diagram of mission-critical disaster recovery. The diagram shows an important deliverable—engineering design architecture diagram—a BC/DR software engineering system produced by BL computing virtualization method. Box 182 BC/DR system architecture comprises two major components: box 1821 prevention system and box 1822 reaction system. Prevention system includes box (1) 18211 black swan system, the theoretical foundation of mission-critical BC/DR system; (2) 18212 drill system, the drill management system for emergency events; (3) 18213 improvement system, responsible for manual improvement, self-improvement, bootstrapping subsystems; and (4) 18214 decision maker cell system, a companion subsystem assisting decision maker to collect his/her frame and emotion data during peace time, and react rapidly during emergency time. Box 1822 reaction system comprises (1) 18221 re-plan subsystem triggered by disaster; (2) 18222 in-time response subsystem triggered by disaster, including automatic analyzing the root cause of the disaster and responding in time; (3) 18223 pre-warning subsystem with PMU to capture the moment right before system crash and inform the reaction in-time subsystem.

FIG. 18B also illustrates this embodiment as a bootstrapping process of a BL computing system from manual activation to automation. Three types of bootstrapping process are as follows:

(1) Semantic knowledge absorption and bootstrapping: absorption of large amount of fact knowledge, including various published professional paper, book, and theories. One example is 18211 black swan theory and the way to transform the words of digital book into a subnet of BCN. Detailed semantic and parsing algorithm is beyond the scope of the disclosed invention, but the bootstrapping process comprises manually transforming the knowledge of black swan knowledge (including bar-bell strategy, concave/convex model, self-similar model, redundancy, system fragility computation, and the $4^{th}$ quadrant model, into network nodes) and gradually converting this manual procedure to automatic way, in particular with self-organized mathematical model to realize the automation. The semantic knowledge is eventually converted into procedural knowledge.

(2) Absorption of procedural knowledge and bootstrapping: absorb large amount of rules of existing rule-bases, open-source programs, and procedural libraries owned by company, acquired commercially, or downloaded from open-source websites (as software product, program, rule-base, company software workflow, etc.). For instance, box 18214 the mobile application for decision maker may be acquired from open-source website. The source code is then converted as BCN subnet. Detailed computer language analysis or rule-base rule analysis is beyond the scope of this disclosed invention, but the bootstrapping process comprises employing manual method to translate programs into BCN nodes, and converting the manual method into automatic method, in particular using the self-organized mathematical theory to realize automation.

(3) Episodic event recording, analyzing and bootstrapping: record multimedia information related to the event, and attach the information to the BCN node (called episodic node). The episodic nodes are different from normal BCN node in that the timestamp is added. In addition, the episodic node connects with semantic node and procedural node. The connection benefits the design of complex event process. For instance, box 18221 re-plan subsystem triggered by disaster and box 18222 in-time responding subsystem are both complex event processes, and both involve root cause analysis. In addition, the design of box 18212 drill subsystem may also be benefited from episodic event recording. Lastly, the improvement subsystem box 18213 is the most critical subsystem, since it may reflect upon past accumulated records for future design and refinement. According to the design principle of FIG. 8C, the intelligence elevator, disaster redundancy and system fragility may be elevated and improved as a degeneracy system. The detailed improvement method and how to design complex event process/root cause analysis is beyond the scope of the disclosed invention, but the bootstrapping process includes employment of manual ways to use past record, constantly reflects on the record for future system design, learns from BCN to design complex event process/root cause analysis, and then converts the manual method to automation, in particular using the self-organized mathematical theory to realize automation.

Figure 18C:
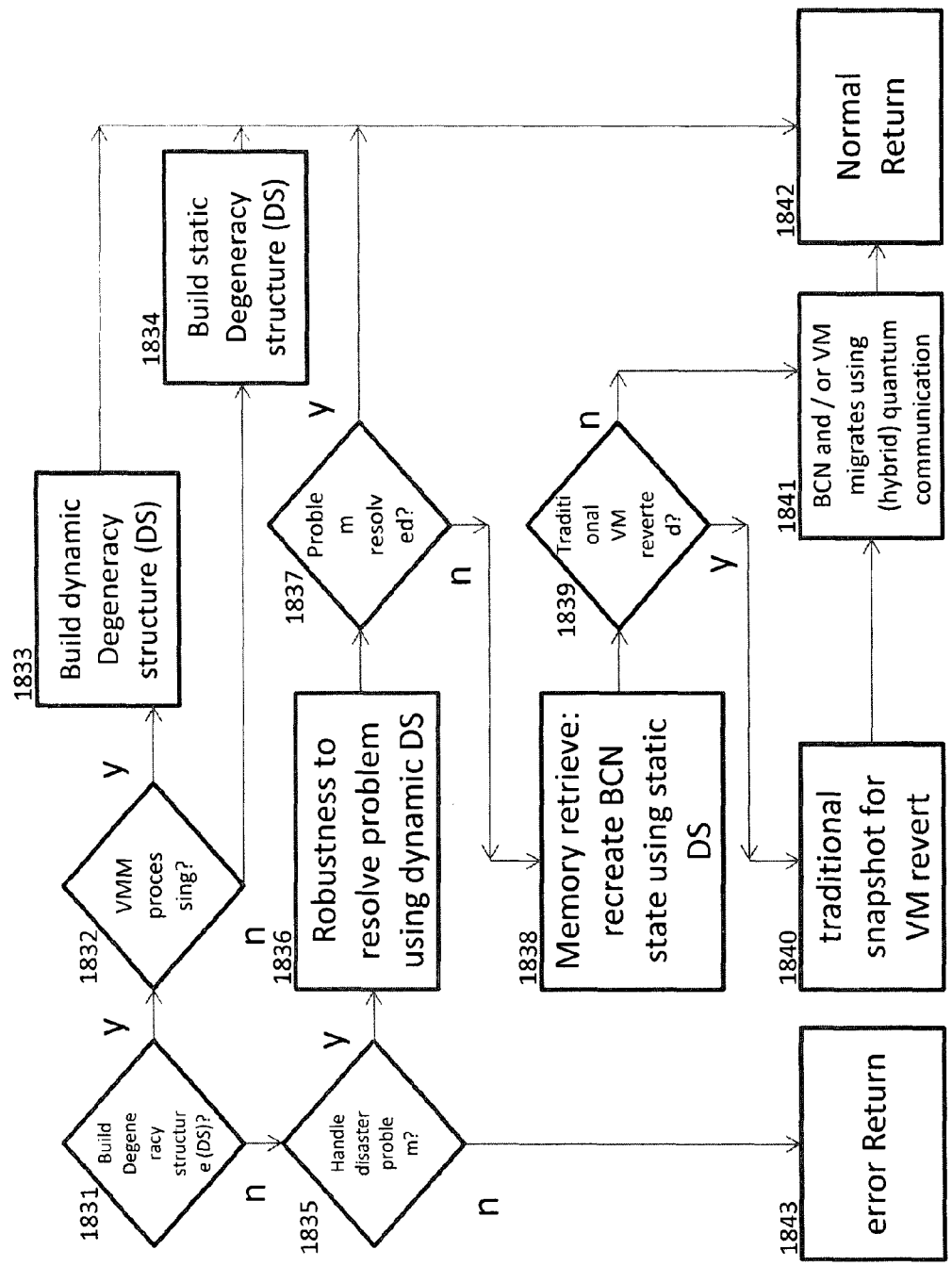
FIG. 18C is the flowchart of OS/VMM layer of a BC/DR system.

FIG. 18C illustrates a problem solution of BL computing. The embodiment can be used in any BC/DR system, not necessarily mission-critical ones. Firstly, when a BL system is built, two degenerated structures (DS) are established: a dynamic degenerated structure (DDS) and a static degenerated structure (SDS). From FIG. 18C it is clear that the primary work of BL VMM is to build a huge BCN, with capability of degeneration, robustness, and complexity. Each re-entrant cycle builds this BCN towards a better dynamic degenerated structure. Right around the time of this BL VMM cycle, BL OS either performs traditional semantic work, or puts this newly-formed BCN into memory, during which time the BCN itself does not change, hence a static degenerated structure. Secondly, when there is a BC/DR problem, BL VMM resorts to utilizing the DDS of the VMM to resolve the problem. The DSS uses multiple degenerated paths to accomplish the solution according to FIG. 18C. If the problem cannot be resolved (such as a hardware problem), a migration process is taken. Not only BL OS image migrates, but BL VMM migrates as well. For BL VMM migration, reverted states are obtained from BL memory wherein the memory recovery method is provided by BL computing virtualization, as in steps 1313 and 1320 of FIG. 13. As for traditional virtual machine (VM), the traditional VM reverting method is used. For both BL memory recovery and traditional VM reverting, their migration completes with quantum communication (see box 96 of FIG. 9).

The detailed flow is as follows:

The function to build degenerated structure:

Step 1831: determine if building DS. If yes, proceed to step 1832. Otherwise, proceed to step 1835;

Step 1832: determine if it is a VMM operation process. If yes, proceed to step 1833. Otherwise, proceed to step 1834;

Step 1833: build dynamic degenerated structure. Proceed to step 1842;

Step 1834: build static degenerated structure. Proceed to step 1842;

The function to handle BC/DR problem:

Step 1835: determine if handling BC/DR problem. If yes, proceed to step 1836. Otherwise, proceed to step 1843;

Step 1836: use dynamic degenerated structure, and its robustness to resolve problem. Proceed to step 1837;

Step 1837: determine if the problem is resolved. If yes, proceed to step 1842. Otherwise, (e.g. hardware problem) proceed to step 1838;

Step 1838: use static degenerated structure to recover memory by rebuilding BCN states. The BCN states are successfully rebuilt. Proceed to step 1839;

Step 1839: determine if traditional VMs need to revert. If yes, proceed to step 1840. Otherwise, proceed to step 1841;

Step 1840: use traditional snapshot to revert VMs. Proceed to step 1841;

Step 1841: BCN and/or VM migrates using (hybrid) quantum communication. Proceed to step 1842;

Step 1842: normal return;

Step 1843: error return.

Technical Effects of BL Computing Virtualization Method

It is obvious from above description that BL computing virtualization method is a complex, cycle-based, and brain-like engine to supply emergent and creative concepts to the applications. When applying BL computing virtualization method, the technical effects are more creative in self-management, self-monitoring, and self-healing. For example, the said BL autonomic computing system has its unconscious layers getting creative inputs from respective conscious layers; the BL multi-core cloud computing system uses the BL performance data to self-improve the performance of individual host system and the whole cloud; the BL software development and service delivery system are now focusing on the strong emergence process to increase success rate; and the BL BC/DR system is able to creatively analyze the root cause, turn out engineering architectural design, and self-improve itself from current existing BC/DR system of own company and knowledge from BC/DR systems of other companies. From a viewpoint of 4 quadrants of the application layer of BL computing virtualization, the above application systems are mostly C-quadrant oriented. There could be lots of other applications in the other 3 quadrants that would be benefited by BL computing virtualization method.

Although the 3 different design styles of BL VMM are stressed in FIG. 3: tightly coupled, median coupled and loosely coupled, in an actual design of BL VMM, the design styles is not limited to what is described, as new modules and new concepts can fall into other setup of the current embodiments. The hardware: traditional, quantum and molecular computers mentioned here is also not exhausted, as newer technology becomes available in the future. In addition, there may be other ways beyond gate model and adiabatic model for realizing BL emulation, since there may be ways not to use hardware gadgets such as in the situation of molecular computing. The applications systems also are not limited to the BL autonomic system, the BL multi-core performance system, the BL software development and service delivery system, and the BL BC/DR system. The application of this generic system is limitless.

The above embodiments enable those skilled in the art to realize or utilize the invention. Those skilled in the art may make various modifications to the invention as long as the modification is within the bounds of the inventive ideas. Therefore the protection range of the invention is not limited to the above embodiments. Rather, it should have the largest protection range described by the technical characteristics of the claims.

The invention claimed is:

1. A method of brain-like (BL) computing virtualization with its operating environment of vertical and horizontal architectures wherein the vertical architecture comprises an affective engine, a conscious engine and an unconscious engine, and the horizontal architecture comprises three layers: (1) a BL application layer, (2) a BL operating system and virtual machine monitor (OS/VMM) layer, which comprises a BL VMM and a BL OS sublayer, the BL OS sublayer comprises an affective engine OS, a conscious engine OS, and an unconscious engine OS, and (3) a BL hardware layer; said BL OS/VMM layer has reentrant BL cycles for said method to process the information of a BL concept entity (BCE), as a node of a BL Concept Network (BCN); said method comprising two types of said reentrant BL cycles wherein a Type 1 BL Cycle comprises:
consolidating at least one BCE in a chaos state (chaos BCE) by the unconscious engine OS;
entering the BL VMM and executing a binding problem 1 (BP 1) solution in the BL VMM wherein a micro emergence model uses said chaos BCE with or without external stimulus to generate a unitary operation object or an object to be entangled locally or remotely; and
if a new BCE from the consolidating is a chaos BCE, creating, by a virtual brain-like state machine (VBSM), a set of metadata and a non-synchronized BCN node, accepting a dispatch from a BL scheduler performing parallel processing for the BL VMM, leaving the BL VMM, and returning to the unconscious engine OS;
a Type 2 BL Cycle comprises:
sending subjective experience from the conscious engine as a new BCE to enter the BL VMM;
executing a BP 1 solution in the BL VMM: the micro emergence model using said subjective experience with or without external stimulus to generate the unitary operation object or an object entangled locally or remotely; if the new BCE has an ordered or critical state, entering a binding problem 2 (BP 2) solution;
executing the BP2 solution in the BL VMM: decomposing the BCE; if the BCE is an attractor, experiencing von Neumann process 2 first and von Neumann process 1 secondly; upon a strong insistent attention, measuring an entangled result, or, upon the involvement of weak attention, experiencing von Neumann process 2 and then von Neumann process 1, but a measurement in von Neumann process 1 has a weak insistent attention; upon a permission of attention, the BCE leaving a von Neumann cycle and continuing a BP2 solution cycle; correcting possible BL errors by Error Cancellation; creating a set of metadata and a synchronized BCN node by said VBSM; accepting a dispatch from the BL scheduler performing network processing for the BL VMM, leaving the BL VMM and entering the conscious engine OS;
if the BCE entering the conscious engine OS is for creating events or semantics, executing a BL cognition model (BCM) of the conscious engine OS;
evaluating to give the BCE an intelligence grade; and
completing the Type 2 BL remaining cycle: saving the BCE, optionally making the BCE as an output to an outside world or internal effector, optionally performing a macro emergence model to realize an emergence communication model, and re-entering the BL VMM with the new BCE or subjective experience.

2. The method of claim 1 wherein said architectures comprising:
said affective engine stands a major difference between BL system and general biological evolution system, and the engine is in charge of free will or attention;
said unconscious engine and said conscious engine work as human split brains, with unconscious engine mimicking left brain, to perform logic thinking of the traditional computer, while the conscious engine mimicking right brain, performs non-logic thinking of quantum computer or molecular computer;
said BL hardware layer comprises a composition of traditional computer and traditional peripheral, quantum computer and quantum peripherals, and molecular computer and nano-devices;
said BL application layer comprises 4 quadrants: (D-quadrant) conscious-engine emergence fact, to realize non-logic analyzing, planning, decision making and executing functions, (I-quadrant) conscious-engine emergent sociality, to process non-logic social base and behavior, (S-quadrant) unconscious-engine logic sociality, to process logic social base and behavior, and (C-quadrant) unconscious-engine logic fact, to realize logic analyzing, planning, decision making and executing function.

3. The method of claim 1 wherein said BL OS/VMM layer, comprising:
running the micro emergence model;
running an affective cognition model (ACM);
running the virtual BL state machine (VBSM);
running a micro memory system;
running an agent and value system, comprising a central control system, an interpersonal processing management module, and a PEP/PDF/Hyperbus resource consumption table;

running a BL emulator, comprising a BL emulation cycle, a BL emulated instruction set, a BL emulated communication, a BL emulated MMU;

running the BL scheduler, supporting parallel processing of a unconscious engine and network processing of a conscious engine; and running an intelligence grade elevator, to elevate intelligence via external stimulus, attention, and a degenerate internal structure, wherein the BL OS/VMM layer can be designed in three ways: loosely-coupled, median-coupled and tightly-coupled; said loosely-coupled design places a kernel outside of the BL emulator; said median-coupled design places the kernel inside of the BL emulator but outside of a BL Turing machine; said tightly-coupled design places the kernel inside of the BL Turing machine; the latter two designs have similar BL cycles of loosely-design; and a BL VMM kernel comprises the micro emergence model and the agent and value system.

4. The method of claim 2 wherein the processes of a plurality of BCNs can be concurrent at any time;

a plurality of BCNs can be connected via sideways-connecting, each other with columnar link to link the BCNs of different layers and different dimensions;

wherein the BCNs can be modeled mathematically, each BCE in the BCNs having one primary intelligence state (or one state) at a time, being chaos state, ordered state, or critical state, wherein the BCE of chaos state simulating neuron firing-and-integration, without conscious thinking; and the BCE of ordered or critical state are synchronized at the same network vibrating frequency, with conscious thinking, wherein improved Kuramoto or Hodgkin-Huxley mathematical model assists to elevate BCE state.

5. The method of claim 3 wherein said micro emergence model executing the following steps:

building difference equation or differential equation of dynamic system, accept the chaos BCE from the unconscious engine OS or subject experience from the conscious engine OS to become an input BCE;

accepting external stimulus to disturb dynamic system, adapt and merge the stimulus;

self-organizing to generate node information for the input BCE, becoming unitary operator at initial $1^{st}$ cycle, or generate node information for the input BCE a new, local or remote, entangling BCE in future cycles;

if the state of the input BCE is chaos, an attention of the ACM deciding if insist on measurement direction: if yes, integrate dynamic system equation incrementally to build node information in a non-synchronous network; otherwise, there is no attention, and no effect;

if the state of the input BCE is ordered or critical, the micro emergence model preparing local or remote entangling object, accepting the attention as ACM output;

if the state of the input BCE is ordered, realizing sideways synchronization, and entering the BL emulator;

if the state of the input BCE is critical, validating whether it is a local or global basin attractor, realizing local or global synchronization, and entering the BL emulator;

via micro output port, the conscious engine sending commands to the unconscious engine, and elevating the state of the input BCE to ordered; and via micro input port, the unconscious engine sending a procedural result to the conscious engine, and informing the conscious engine the state of the input BCE.

6. The method of claim 3 wherein said ACM executing the following steps:

accepting from the affective engine OS a psychological frame and emotion as input;

using a plurality of subject value functions based on prospect theory;

extending prospect theory to an experience-utility function and a prediction-utility function;

assuming in a continuous decision making process; the shapes and parameters of the subjective value functions varying with a decision maker's affective state and a working confidence; an output of ACM being an attention obtained via a judgment of rationale experience;

deciding BCE unitary operation or entangled time-space depth, simulating neurons deciding whether to release neurotransmitters and ions, or whether to open or close gap junctions of gamma synchrony;

influencing said attention by a central control system and based on reward function, and the central control system optionally accepting external control; and if the unconscious engine, the conscious engine and the affective engine composing into a set of BL engine simulating a human brain or self, and the central control system controlling a plurality of the set of BL engine running on top of the BL VMM, simulating multiple human brain or multiple selves.

7. The method of claim 3 wherein said VBSM executing the following steps:

setting and getting BCE system states, including system state values: initialized, entangled, attended, disentangled, and memory-lost;

setting and getting intelligence state values, including no-firing chaos, firing chaos, initial ordered, advanced ordered, local critical, and global critical;

setting and getting fidelity values of BCE data measurement in case of quantum computing;

setting and getting meta data and data to assist building BCN node; and setting and getting meta data and data to assist BCE database search.

8. The method of claim 3 wherein said BL emulated instruction set, comprising:

adding BCE dynamically: to replace the traditional CPU interrupt, there is no need of interrupt since a BCE or a BCN subnet can be added to process newly-created concept thus to avoid synchronous or asynchronous operations;

converting data from digital bit to qubit: traditional digital data is able to convert to qubit data, and vice versa, if necessary, traditional digital data is first converted to data of molecular or atomic computing, and then converted to qubit data, and vice versa;

generating new BCE: to generate a new BCE upon the command from the BL OS sublayer, in case of quantum computing, the new BCE may be a remote quantum to be entangled;

consolidating chaos BCE: to consolidate at least one chaos BCE upon the command from the BL OS sublayer in a non-synchronized network, simulating neuronal firing and integration;

inputting subjective experience: as an input to von Neumann process 2 of the BL Turing machine;

inputting attention: as an input into the BL Turing machine, attention represents external character of the person measuring the quantum experiment;

entangling BCE;

switching mode of the BL VMM and the BL OS sublayer; and interfacing with the BL VMM kernel within instruction subsets, comprising the mode switch of the BL VMM kernel and the BL emulator at the BCN for the loosely-coupled design, interface of the emergence mathematical model to outside world, including self-similar interface, and the micro input and output ports.

9. The method of claim 1 wherein said BL OS sublayer comprises the following 4 software components:

the unconscious engine OS comprising Markovian and non-Markovian machine learning library, chaos concept consolidation driver, and traditional computer languages;

the conscious engine OS comprising the BCM, an intelligence evaluator, and a teleological language;

the affective engine OS;

a plurality of common OS components comprising a BL memory component and a BL communication component, wherein the BL memory component comprises declarative semantic memory, episodic memory, and non-declarative procedural memory; and the BL communication component comprises a strong emergence communication model, a weak emergence communication model, and a community discovery method.

10. The method of claim 9 wherein said BCM defines an intelligence grade via one of the following intelligence evaluation methods:

measuring the intelligence grade of a unitary-operation BCE with reasonableness;

measuring the intelligence grade of an entangled BCE with meaning, coherence, and the violations of Bell inequalities;

measuring the intelligence grade of an interfered BCE with interference pattern and normalized superposition;

measuring the intelligence grade of more than 2 BCEs with identity, individuality, and micro/macro Schrodinger cat;

running Graver algorithm using the above 4 said intelligent grades, to compare intelligence measurements from database sampling; and inputting results of traditional semantic analysis, said analysis comprises parsing analysis, semantic analysis, semantic labeling and disambiguation.

11. The method of claim 9 wherein the teleological language comprising the following instructions:

generating and controlling intelligent concepts as a high-level language of the BL OS sublayer, wherein the high-level language itself can be written in the teleological language with a core based on the BL emulated instruction set;

using parsing and semantic analysis similar to traditional language, wherein a main body of the language comprising the following logic: defining and accepting a designated goal; upward programming with upcalls to check if a current operation matches the designated goal; if not, modify the operation;

providing a man-machine interface, including an application input, an automatic script input, an external stimulus input and an input of reinforced learning, talent, and experience from programmers;

providing a component library interface for the emergence communication model (ECf), wherein the BL memory component comprises declarative and non-declarative memory, and the BCM; a plurality of conscious engine applications communicate with the common OS components via said ECf; and providing an interactive Interface (IIf) to a traditional language including but not limiting to Prolog, Python and java: communicate with the traditional language via three kinds of IIf: (a) use of aspect-programming techniques to insert the instructions of upward programming by extending the traditional language; (b) the teleological language program and the traditional-language program as two separate programs to interact via IIf; (c) the teleological language and the traditional language combine to form a new language including one language as an in-line insertion to another language, wherein said ECf talks with the emergence communication model, comprising:

if individual emergence, the macro emergence model maintaining single BCE to present agency, meaning, value and work;

if group emergence and all BCEs in the group are useful, the macro emergence model maintaining multiple BCEs to move to the same direction; and if group emergence and not all BCEs in the group are useful, selecting either a grading algorithm or a what-if algorithm.

12. The method of claim 9 wherein the BL memory component comprising the following instructions:

Modeling, by semantic memory, with frame, block, & network schema data type;

reading and writing, by episodic memory, with a symbolic Prolog language;

reading and writing, by procedural memory, with the unconscious engine;

reading and writing, by associate memory, with quantum theory and neural network;

if BCE state is written to said VBSM, using quantum theory to calculate fidelity;

modeling BCE stream with quantum coherence;

modeling a train of BCEs with diffused quantum coherence to lead to a train of mental states; and processing basic BL memory read/write operations with a micro memory system of the BL VMM, wherein said micro memory system is influenced by frame, emotion and value system; processing write operation with information categorization and multiple-process creation; processing read operation with multiple processes reappearing information via degeneration.

13. The method of claim 9 wherein the macro emergence model executing the following steps:

acting as a manager of BL OS communication resources;

exchanging information between the conscious engine OS and the unconscious engine OS, simulating human inter-hemispheric communication;

using social communication among multiple persons, or multiple OS sets, each OS sets including the conscious engine OS, the unconscious engine OS and the affective engine OS;

communicating with the contents of routines of a plurality of BCEs, according to said intelligence evaluation method wherein the BCEs are defined as strong emergence of high grade, weak emergence of low grade, and chaos emergence of very low intelligence;

If weak emergence, looking for a routine for a weak BCE to insert; and

If strong emergence, organizing several routines collectively to satisfy a strong BCE.

14. The method of claim 3 wherein the BCE state elevator executing the following steps:

elevating multi-stage states, wherein a BCE is decomposed or entangled to combine with many concepts at each stage; the BCE may be an indecomposable atomic node, or a decomposable concept group as an entire BCN or its subnet, a train of individual concepts or a concept stream where many concepts are entangled;

elevating the intelligence grade of a BCE by dividing each of the three primary BCE states chaos, ordered, and critical respectively into 2 secondary sub-states to obtain 6 sub-states of non-connecting chaos, connecting chaos, initial ordered, highly ordered, local critical, and global critical, wherein the informational quantity must increase exponentially, and must pass through a threshold between two secondary sub-states;

discriminating, interpreting, and acting on the received information, wherein said activities rely on information-carried ion or electron when they experiences unitary operation or entanglement; for a BCE in the BL VMM, determination must be made if measurement of unitary operation or entanglement is acceptable; if a protocol is to be changed, and if the information is selected, leaving BL VMM; the BCE must be cognized with parsing and semantic analysis, and eventually merged, transferred, propagated, or refused; and entangling a plurality of BCEs of same vibrating frequency, wherein the farther the distance in BCNs between entangled BCEs, the more probable to have a high intelligence grade, and more risks of forming totally unreasonable BCE.

15. The method of claim 3 wherein the intelligence grade elevator executing the following steps:

elevating the intelligence grade through external stimulus, attention, and internal degenerated structure wherein said attention is disturbed by external stimulus, hence promotes the self-adaptation of internal structure; attention increases BCE network-connecting capability and the number of BCEs to pass through a connecting threshold; attention increases the BCE network-connecting capability and network-synchronizing capability of many other related BCEs to pass through a synchronization threshold; attention promotes BCE regularity to pass through a ordered threshold; attention facilitates BCE basin attractor to pass through a critical threshold; attention facilitates the conglomeration of basin attractor to pass through a global threshold;

elevating the intelligence grade of a BCE using degenerated internal structure of a BL system upon the following 6 conditions:

elevating the BCE in a connecting chaos state wherein a complexity factor of the BCE changes from zero to low; a robustness factor of the BCE changes from zero to pure redundancy without functional plasticity but with redundant system buffers, and attention agent can only participate in system responses related to a few tasks;

elevating the BCE in an initially ordered state wherein a complexity factor of the BCE increases from low; a robustness factor of the BCE changes from pure redundancy to pure redundancy with functional plasticity, meaning multiple attention agents are degenerated but only similar in one type of a task;

elevating the BCE in a highly synchronized state: a complexity factor of the BCE keeps increasing; a robustness factor of the BCE changes from pure redundancy with functional plasticity to functional redundancy, indicating the end state of a task reassignment, but begin state of resource reconfiguration, or tasks in one functional group increases while tasks of another group decreases; resource of $1^{st}$ group is supported by $2^{nd}$ in-excess group via reassignment pathway;

elevating the BCE in a to local critical state wherein a complexity factor of the BCE changes from low to high, a robustness factor of the BCE changes from functional redundancy and is added with functional plasticity to become local degeneracy, wherein resource reconfiguration is large via different reassignment pathways; the award function of an attention agent encourages the boldness to innovate; and elevating the BCE in a global critical state wherein a complexity factor of the BCE changes from high to extremely high, and a robustness factor changes from local degeneracy to global degeneracy, wherein concurrent multi-networks, and distributed responses involve chains of multiple, mutually-degenerated attention agents; the award function of attention agent encourages the boldness to innovate, thus autocatalyzes an intelligence elevation.

16. One or more computer-readable media storing computer-useable instructions that, when used by one or more computing devices, cause the one or more computing devices to perform a method of BL computing virtualization with its operating environment of vertical and horizontal architectures, wherein the vertical architecture comprises an affective engine, a conscious engine and an unconscious engine, and the horizontal architecture comprises three layers: (1) BL application layer, (2) BL OS/VMM layer, which comprises an affective engine OS, a conscious engine OS, an unconscious engine OS, and a BL VMM, and (3) BL hardware layer; said BL OS/VMM layer has reentrant BL cycles for said method to process the information of a BCE, as a node of a BCN; said method comprising two types of said BL cycles wherein Type 1 BL Cycle comprises:

consolidating at least one chaos BCE by the unconscious engine OS;

entering the BL VMM and executing a BP 1 solution in the BL VMM wherein a micro emergence model uses said chaos BCE with or without external stimulus to generate a unitary operation object or an object to be entangled locally or remotely; and if a new BCE from the consolidating is a chaos BCE, creating, by a VBSM, a set of metadata and a non-synchronized BCN node, accepting a dispatch from a BL scheduler performing parallel processing for the BL VMM, leaving the BL VMM, and returning to the unconscious engine OS;

Type 2 BL Cycle comprises:

sending subjective experience from the conscious engine as a new BCE to enter the BL VMM;

executing a BP 1 solution in the BL VMM: the micro emergence model using said subjective experience with or without external stimulus to generate unitary operation object or an object entangled locally or remotely; if the new BCE has an ordered or critical state, entering a BP 2 solution;

executing the BP2 solution in BL VMM: decomposing the BCE; if the BCE is an attractor, experiencing von Neumann process 2 first and von Neumann process 1 secondly; upon a strong insistent attention, measuring an entangled result, or, upon an involvement of weak attention, experiencing the von Neumann process 2 and then the follow-up von Neumann process 1, but a measurement in von Neumann process 1 has a weak insistent attention; upon a permission of attention, the BCE leaving a von Neumann cycle and continuing a BP2 solution cycle; correcting possible BL errors by Error Cancellation; creating a set of metadata and a synchronized BCN node by said VBSM; accepting a dispatch from the BL scheduler performing network processing for the BL VMM, leaving the BL VMM and entering conscious engine OS;

if the BCE entering the conscious engine OS is for creating events or semantics, executing a BCM of the conscious engine OS;

evaluating to give the BCE an intelligence grade; and completing the Type 2 BL cycle: saving BCE, optionally making BCE as an output to an outside world or an internal effector, optionally performing a macro emergence model to realize an emergence communication model, and re-entering the BL VMM with the new BCE or subjective experience.

* * * * *